US011119435B2

(12) United States Patent
Okuno et al.

(10) Patent No.: US 11,119,435 B2
(45) Date of Patent: Sep. 14, 2021

(54) DRIVE TRANSMISSION DEVICE AND IMAGE FORMING APPARATUS

(71) Applicant: CANON KABUSHIKI KAISHA, Tokyo (JP)

(72) Inventors: Kazuhide Okuno, Mishima (JP); Hiroyuki Tanaka, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 15/876,621

(22) Filed: Jan. 22, 2018

(65) Prior Publication Data
US 2018/0210390 A1    Jul. 26, 2018

(30) Foreign Application Priority Data

Jan. 24, 2017  (JP) .............................. JP2017-010063
Jan. 24, 2017  (JP) .............................. JP2017-010064
Nov. 13, 2017  (JP) .............................. JP2017-218073

(51) Int. Cl.
*G01G 21/18* (2006.01)
*G03G 15/00* (2006.01)
(Continued)

(52) U.S. Cl.
CPC ............. *G03G 15/757* (2013.01); *F16D 1/10* (2013.01); *F16H 21/18* (2013.01); *F16H 37/02* (2013.01);
(Continued)

(58) Field of Classification Search
CPC ............... G03G 15/757; G03G 21/186; G03G 2221/1657; G03G 21/1647;
(Continued)

(56) References Cited

U.S. PATENT DOCUMENTS 5,022,645 A * 6/1991 Green .................... B65H 5/021
271/276
7,899,364 B2    3/2011 Chadani
(Continued)

FOREIGN PATENT DOCUMENTS

CN    101435494 A    5/2009
CN    102169319 A    8/2011
(Continued)

OTHER PUBLICATIONS

Chinese Office Action issued in corresponding Chinese Application No. 201810061240.0 dated Oct. 20, 2020.
(Continued)

*Primary Examiner* — Justin N Olamit
(74) *Attorney, Agent, or Firm* — Venable LLP

(57) ABSTRACT

A drive transmission device includes a driving-side coupling, a driven-side coupling, and an intermediary transmission member provided therebetween. The driving-side coupling and the intermediary transmission member engage with each other so as to be movable in a first direction. The driven-side coupling and the intermediary transmission member engage with each other so as to be movable in a second direction crossing the first direction. The intermediary transmission member is held by a holding-side coupling which is one of the driving and the driven-side couplings or by a shaft member engaging with the holding-side coupling. Engagement of the intermediary transmission member with a non-holding-side coupling which is the other coupling permits a deviation angle about an axis extending in the first direction and a deviation angle about an axis extending in the second direction.

17 Claims, 31 Drawing Sheets

(51) Int. Cl.
*F16H 21/18* (2006.01)
*G03G 21/16* (2006.01)
*F16H 37/02* (2006.01)
*G03G 21/18* (2006.01)
*F16D 1/10* (2006.01)

(52) U.S. Cl.
CPC ..... *G03G 15/5008* (2013.01); *G03G 21/1647* (2013.01); *G03G 21/1671* (2013.01); *G03G 21/1676* (2013.01); *G03G 21/186* (2013.01)

(58) Field of Classification Search
CPC ......... G03G 21/1857; F16D 1/10; F16D 3/10; F16D 3/04; B65H 2403/72; B65H 2403/722; B65H 2400/73
See application file for complete search history.

(56) References Cited

U.S. PATENT DOCUMENTS

| | | | | |
|---|---|---|---|---|
| 8,244,159 | B2* | 8/2012 | Woo | G03G 21/186 399/167 |
| 8,437,669 | B2* | 5/2013 | Morioka | G03G 15/0121 399/279 |
| 8,736,120 | B2* | 5/2014 | Maeda | F16D 3/04 310/75 D |
| 9,268,247 | B2 | 2/2016 | Yamazaki et al. | |
| 9,354,560 | B2* | 5/2016 | Imaizumi | G03G 15/1615 |
| 9,684,261 | B2* | 6/2017 | Miyabe | G03G 21/1853 |
| 10,139,777 | B2 | 11/2018 | Sato | |
| 2004/0185945 | A1* | 9/2004 | Barron | F16D 1/10 464/157 |
| 2005/0191092 | A1 | 9/2005 | Toso | |
| 2008/0134824 | A1 | 6/2008 | Jung | |
| 2009/0131212 | A1 | 5/2009 | Marumoto | |
| 2011/0058851 | A1 | 3/2011 | Okabe | |
| 2012/0183331 | A1 | 7/2012 | Huang | |

FOREIGN PATENT DOCUMENTS

| | | |
|---|---|---|
| CN | 202067076 U | 12/2011 |
| CN | 104516224 A | 4/2015 |
| CN | 105793780 A | 7/2016 |
| CN | 105824225 A | 8/2016 |
| JP | 06-025707 U | 4/1994 |
| JP | H09-90853 A | 4/1997 |
| JP | 11-338211 A | 12/1999 |
| JP | 2002-70981 A | 3/2002 |
| JP | 2005-76734 A | 3/2005 |
| JP | 101206446 A | 6/2008 |
| JP | 2015-179233 A | 10/2015 |
| WO | WO 2015-144090 * | 1/2015 |

OTHER PUBLICATIONS

Chinese Office Action dated Jul. 8, 2021 in counterpart Chinese application No. 201810061240.0 (English translation included).

* cited by examiner (a)

(b)

(a) (b)

(a) (b)

(a)

(b)

(a)

(b)

(a)  (b)

(a)

(b)

(a)

(b)

(a)

(b)

(a)

(b)

(a)

(b)

(a)

(b)

(a)

(b)

(a)

(b)

(a)

(b)

(a)

(b)

(c)

DRIVE TRANSMISSION DEVICE AND IMAGE FORMING APPARATUS

FIELD OF THE INVENTION AND RELATED ART

The present invention relates to a drive transmission device for transmitting a driving force from a driving side to a driven side and relates to an image forming apparatus including the drive transmission device.

Conventionally, an Oldham's coupling mechanism is used for transmitting rotation (rotational force) of a rotatable member to another rotatable member provided substantially coaxially with the rotatable member. In general, the Oldham's coupling mechanism is constituted by a pair of couplings on which projected portions are formed and by an intermediary transmission member which is provided between the couplings and which includes both end portions where groove portions engageable with the projected portions of the couplings.

Part (a) of FIG. 30 is an exploded perspective view showing a structure of a general-purpose Oldham's coupling. On a driving(-side) coupling 991, a projected portion 991a extending in an x direction perpendicular to a rotational axis z1 of the driving-side coupling 991 is formed. On a driven(-side) coupling 992, a projected portion 992a extending in a y direction perpendicular to a rotational axis z2 of the driven-side coupling 992 and the x direction is formed. On an intermediary transmission member 993, a groove portion 993a engageable with the projected portion 991a and a groove portion 993b engageable with the projected portion 992a are formed. When drive (driving force) is transmitted to the driving-side coupling 991, the projected portion 991a and the groove portion 993a engage with each other so as to be movable relative to each other, and the projected portion 992a and the groove portion 993b engage with each other so as to be movable relative to each other.

By the above-described constitution, even when the rotational axis z1 and the rotational axis z2 of the both couplings are eccentric relative to each other, the intermediary transmission member 993 rotates so that eccentricity in the x direction is absorbed between the projected portion 991a and the groove portion 993a and so that eccentricity in the y direction is absorbed between the projected portion 992a and the groove portion 993b. For that reason, the eccentricity can be permitted.

Further, even when deviation angles are formed between the rotational axis z1 and the rotational axis z2, the intermediary transmission member 993 rotates so that the deviation angle about the axis, extending in the y direction is absorbed between the projected portion 991a and the groove portion 993a and so that the deviation angle, about the axis, extending in the x direction is absorb between the projected portion 992a and the groove portion 993b. For that reason, the deviation angles can be permitted.

Incidentally, conventionally in the case where drive (driving force) is coaxially transmitted between an image forming apparatus main assembly (hereinafter, referred to as an apparatus main assembly) and an insertion and removed unit which is insertable into and removable from the apparatus main assembly, an Oldham's coupling mechanism having a constitution as disclosed in Japanese Laid-Open Patent Application (JP-A) Hei 11-338211. In this constitution, all of constituent elements of the Oldham's coupling mechanism are provided on the apparatus main assembly side. When the insertion and removal unit is inserted into the apparatus main assembly, engagement is established between a coupling, of the Oldham's coupling mechanism, provided on the apparatus main assembly side and an engaging member provided in the apparatus main assembly. As a result, the drive (driving force) is transmitted between the apparatus main assembly and the insertion and removal unit.

In the above-described constitution, in addition to the Oldham's coupling mechanism, another engaging member is needed, but in order to downsize the image forming apparatus, as disclosed in Japanese Utility-Model Application Publication Hei 6-25707, a constitution in which there is no need to provide the engaging member has been known. In this constitution, one of couplings of the Oldham's coupling mechanism is held by the apparatus main assembly, and the other coupling is held by the insertion and removal unit. Further, in order to prevent disconnection of the intermediary transmission member during the insertion and removal of the insertion and removal unit, the intermediary transmission member is held by either one of the couplings or by a shaft member engaging with the coupling.

FIG. 31 is a drive transmission device including an intermediary transmission component part 113. The intermediary transmission component part 113 includes a rotational axis z3 of an output shaft 111 provided on a driving side and a rotational axis z4 of an input shaft 112 provided on a driven side coaxially with the rotational axis z3. The intermediary transmission component part 113 includes an inner gear 113a provided between the axes and engaging with both of an outer gear 111a provided on the driving-side output shaft 111 and an outer gear 112a provided on the driven-side input shaft 112. This intermediary transmission component part 113 is supported only by the driving-side output shaft 111 and the driven-side input shaft 112. Further, each of the outer gear 111a on the output shaft 111 and the outer gear 112a on the input shaft 112 is constituted by a crowning gear. As a result, the intermediary transmission component part 113 is capable of being inclined with respect to an X direction (up-down direction in FIG. 31) and a Y direction (front-rear direction in FIG. 31) which are perpendicular to the rotational axes z3 and z4. Further, eccentricity of the rotational axis z3 of the driving-side output shaft 111 and eccentricity of the rotational axis z4 of the driven-side input shaft 112 are permitted, so that the drive (driving force) can be stably transmitted from the output shaft 111 to the input shaft 112 (JP-A 2015-179233).

Incidentally, in the constitution as disclosed in Japanese Utility-Model Application Publication Hei 6-25707, at an engaging portion between the intermediary transmission member and a holding(-side) coupling by which the intermediary transmission member is held, the deviation angle is not readily permitted. For example, in part (a) of FIG. 30, in the case where the intermediary transmission member 993 is held by the driving-side coupling 991 as a holding-side coupling through an unshown method, at an engaging portion between the groove portion 993a and the projected portion 991a, a movable range about the axis extending in the y direction narrows. Also at an engaging portion between the intermediary transmission member 993 and the driven-side coupling 992 as a non-holding-side coupling by which the intermediary transmission member 993 is not held, these members do not freely move about the axis extending. For that reason, as an entirety of the Oldham's coupling mechanism, the deviation angle about the axis extending in the y direction is not readily permitted. When the Oldham's coupling has the deviation angle which is not readily permitted, the deviation angle causes inconveniences such that rotation non-uniformity, vibration and noise generate and that abrasion is promoted and thus a lifetime of the Oldham's coupling is shortened. Further, when the Oldham's coupling having the deviation angle which is not readily permitted is used in the image forming apparatus, the Oldham's coupling causes an image problem such that stripe-shaped non-uniformity which is called banding appears on an image due to the rotation non-uniformity and the vibration.

In order to permit the deviation angle in the above-described Oldham's coupling, it would be considered that a constitution in which a groove portion of an intermediary transmission member is provided with play is employed as in JP-A Hei 11-338211. However, a state of engagement of the intermediary transmission member with the non-holding-side coupling is different between the Oldham's coupling using the intermediary transmission member including the groove portion free from play and the Oldham's coupling using the intermediary transmission member including the groove portion provided with play. Parts (b) and (c) of FIG. 30 are schematic views each showing motion of an engaging portion in the case where between the groove portion of the intermediary transmission member and the projected portion 992a of the driven-side coupling 992 as the non-holding-side coupling, the eccentricity is provided but the deviation angle is not formed. Part (b) of FIG. 30 is the schematic view in the case where the intermediary transmission member 993 including the groove portion 993b free from play is used, and (c) of FIG. 30 is the schematic view in the case where an intermediary transmission member 994 including a groove portion 994b provided with play is used. In the case where there is no deviation angle, as shown in part (b) of FIG. 30, the motion of the engaging portion between the groove portion 993b of the intermediary transmission member 993 and the projected portion 992a of the driven-side coupling 992 is carried out while these portions are in surface-contact with each other. However, as shown in part (c) of FIG. 30, the motion of the engaging portion between the groove portion 994b of the intermediary transmission member 994 and the projected portion 992a of the driven-side coupling 992 is carried out while these portions are in line-contact with each other. When the portions move at the engaging portion in line-contact with each other, the portions slide with each other in a high pressure state compared with the case of the surface contact, so that abrasion is promoted. Accordingly, the Oldham's coupling having such a constitution is decreased in lifetime with use thereof when compared with the general-purpose Oldham's coupling.

When the above-described Oldham's coupling engages, irrespective of a rotational direction, engagement of the projected portion 992a with the groove portion 993b and engagement of the projected portion 991a with the groove portion 993a are prevented from being eliminated. That is, a state in which the drive is always connected to a feeding roller pair provided on a side downstream of the Oldham's coupling engaging portion is formed. In that case, a jam generates in the image forming apparatus, and when a user intends to clear the jam by pulling out a sheet in a state in which the sheet is jammed between the downstream feeding roller pair, an operating force for rotating the feeding roller pair to a position upstream of the Oldham's coupling engaging portion is needed. As a result, there is a possibility that the operating force excessively increases and that an excessive force is exerted on the sheet and thus the sheet is torn. In order to solve such a problem, provision of a drive-eliminating clutch mechanism on a side upstream of the feeding roller pair is effective. However, in addition to the Oldham's coupling mechanism, when the clutch mechanism for releasing (eliminating) the drive in one direction is added, the number of component parts increases, so that a driving unit increases in size.

SUMMARY OF THE INVENTION

According to an aspect of the present invention, there is provided a drive transmission device comprising: a driving-side coupling; a driven-side coupling; and an intermediary transmission member provided between the driving-side coupling and the driven-side coupling and configured to transmit a rotational driving force from the driving-side coupling to the driven-side coupling, wherein the driving-side coupling and the intermediary transmission member engage with each other so as to be movable in a first direction perpendicular to an axis which is a rotation center of the driving-side coupling, wherein the driven-side coupling and the intermediary transmission member engage with each other so as to be movable in a second direction crossing the first direction and perpendicular to an axis which is a rotation center of the driven-side coupling, wherein the intermediary transmission member is held by a holding-side coupling which is one of the driving-side coupling and the driven-side coupling or by a shaft member engaging with the holding-side coupling, and wherein engagement of the intermediary transmission member with a non-holding-side coupling which is the other one of the driving-side coupling and the driven-side coupling permits a deviation angle about an axis extending in the first direction and a deviation angle about an axis extending in the second direction.

According to another aspect of the present invention, there is provided an image forming apparatus for forming an image on a sheet, comprising: a unit including a driven-side coupling and detachably mountable to the image forming apparatus; a driving-side coupling; and an intermediary transmission member provided between the driving-side coupling and the driven-side coupling and configured to transmit a rotational driving force from the driving-side coupling to the driven-side coupling, wherein the driving-side coupling and the intermediary transmission member engage with each other so as to be movable in a first direction perpendicular to an axis which is a rotation center of the driving-side coupling, wherein the driven-side coupling and the intermediary transmission member engage with each other so as to be movable in a second direction crossing the first direction and perpendicular to an axis which is a rotation center of the driven-side coupling, wherein the intermediary transmission member is held by a holding-side coupling which is one of the driving-side coupling and the driven-side coupling or by a shaft member engaging with the holding-side coupling, and wherein engagement of the intermediary transmission member with a non-holding-side coupling which is the other one of the driving-side coupling and the driven-side coupling permits a deviation angle about an axis extending in the first direction and a deviation angle about an axis extending in the second direction.

Further features of the present invention will become apparent from the following description of exemplary embodiments with reference to the attached drawings.

Figure 4:
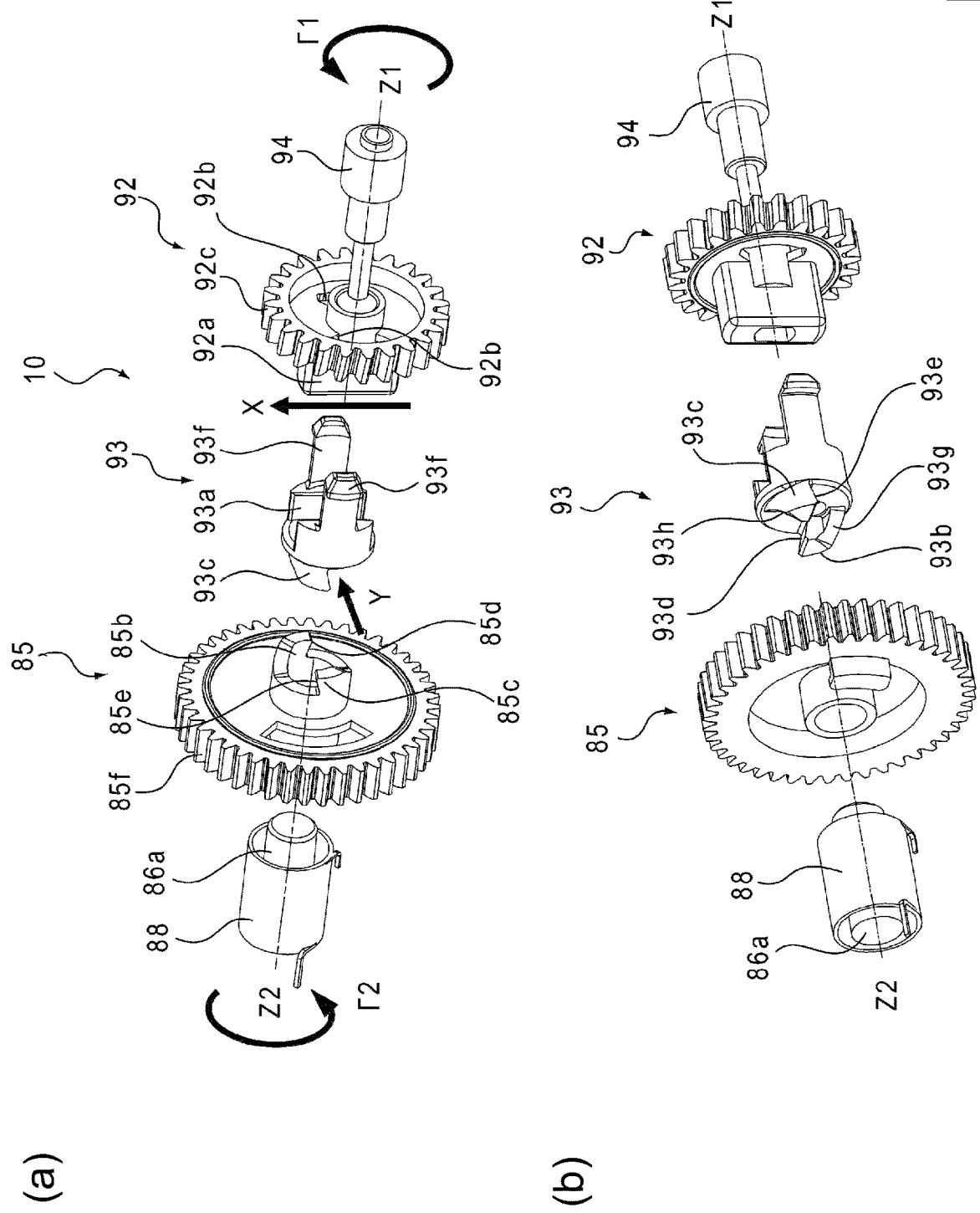

Parts (a) and (b) of FIG. 4 are exploded perspective views showing a structure of the coupling portion in Embodiment 1.

Figure 5:
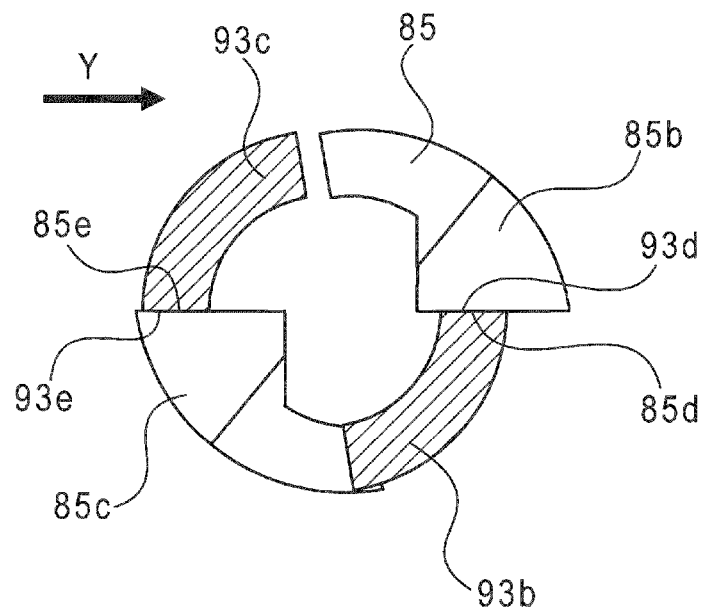
Figure 5:
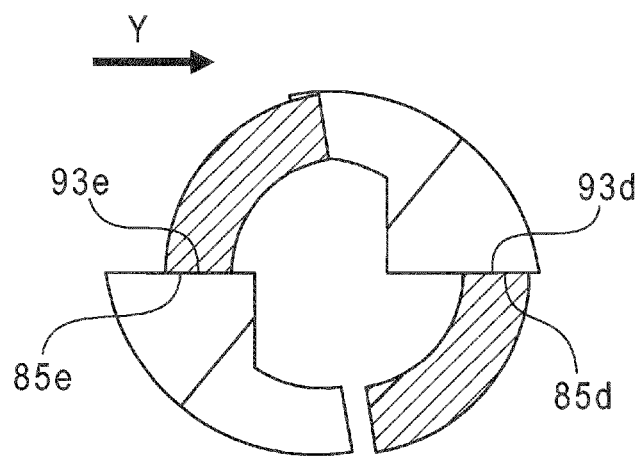

Parts (a) and (b) of FIG. 5 are schematic views showing a principle of eccentricity absorption of the coupling portion with respect to a Y direction in Embodiment 1.

Figure 6:
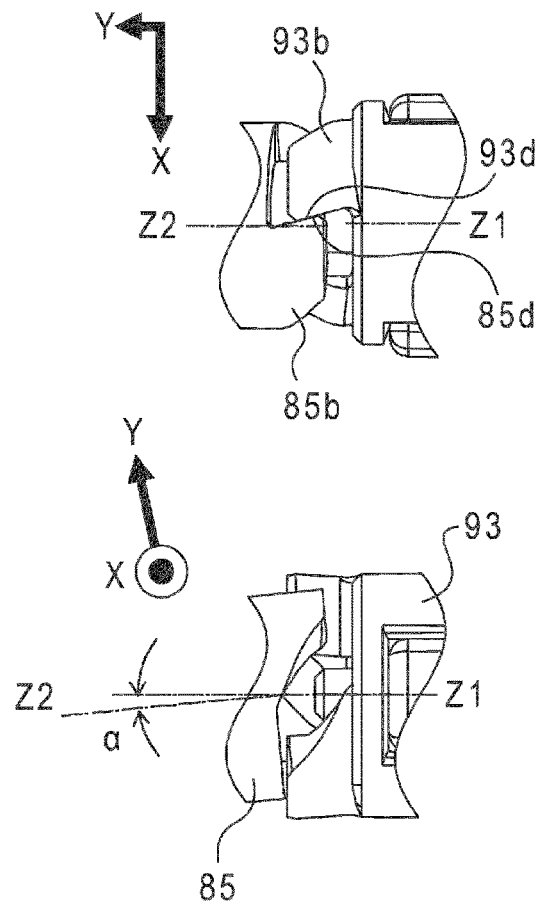
Figure 6:
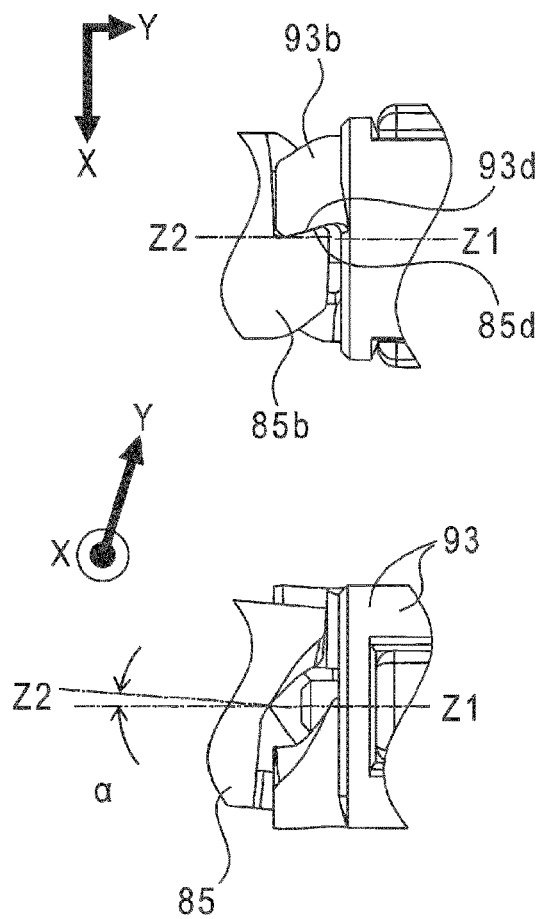
Figure 6:
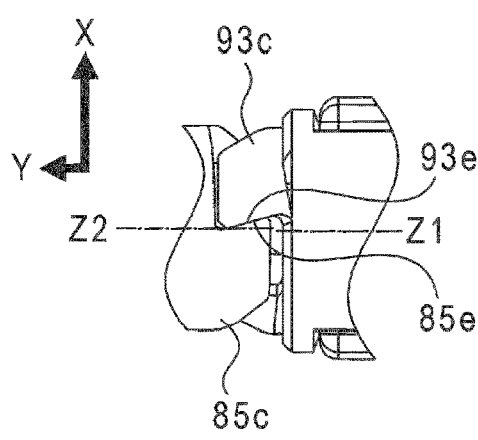
Figure 6:
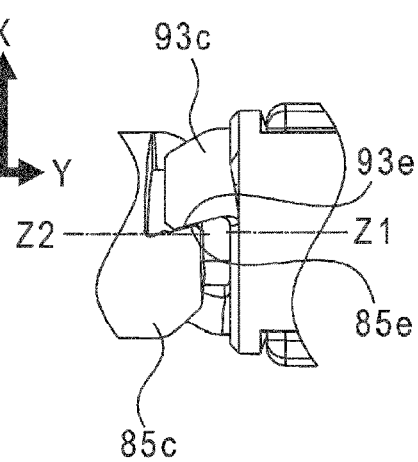

Parts (a) and (b) of FIG. 6 are schematic views showing a principle of deviation angle absorption of the coupling portion about an axis in an X direction.

Figure 7:
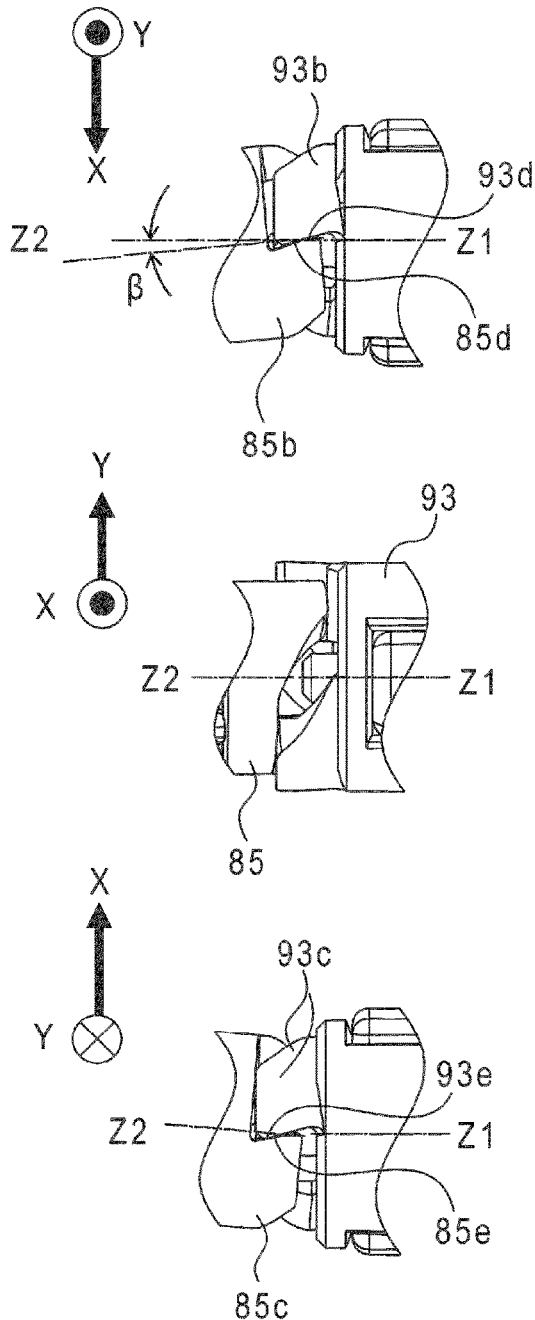
Figure 7:
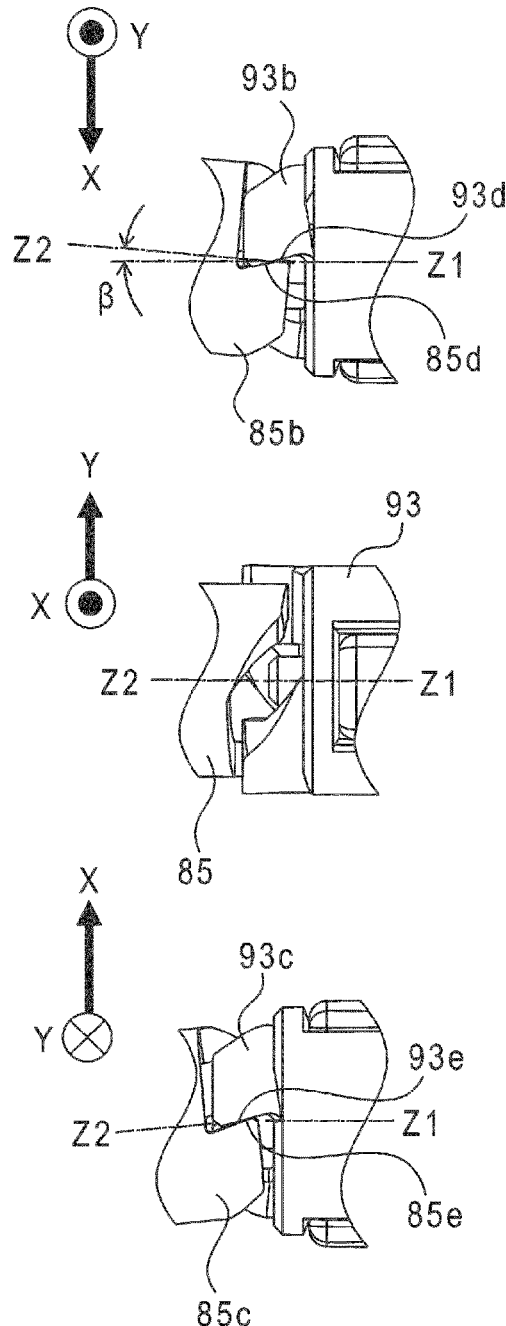

Parts (a) and (b) of FIG. 7 are schematic views showing a principle of deviation angle absorption of the coupling portion about an axis extending in the Y direction.

Figure 8:
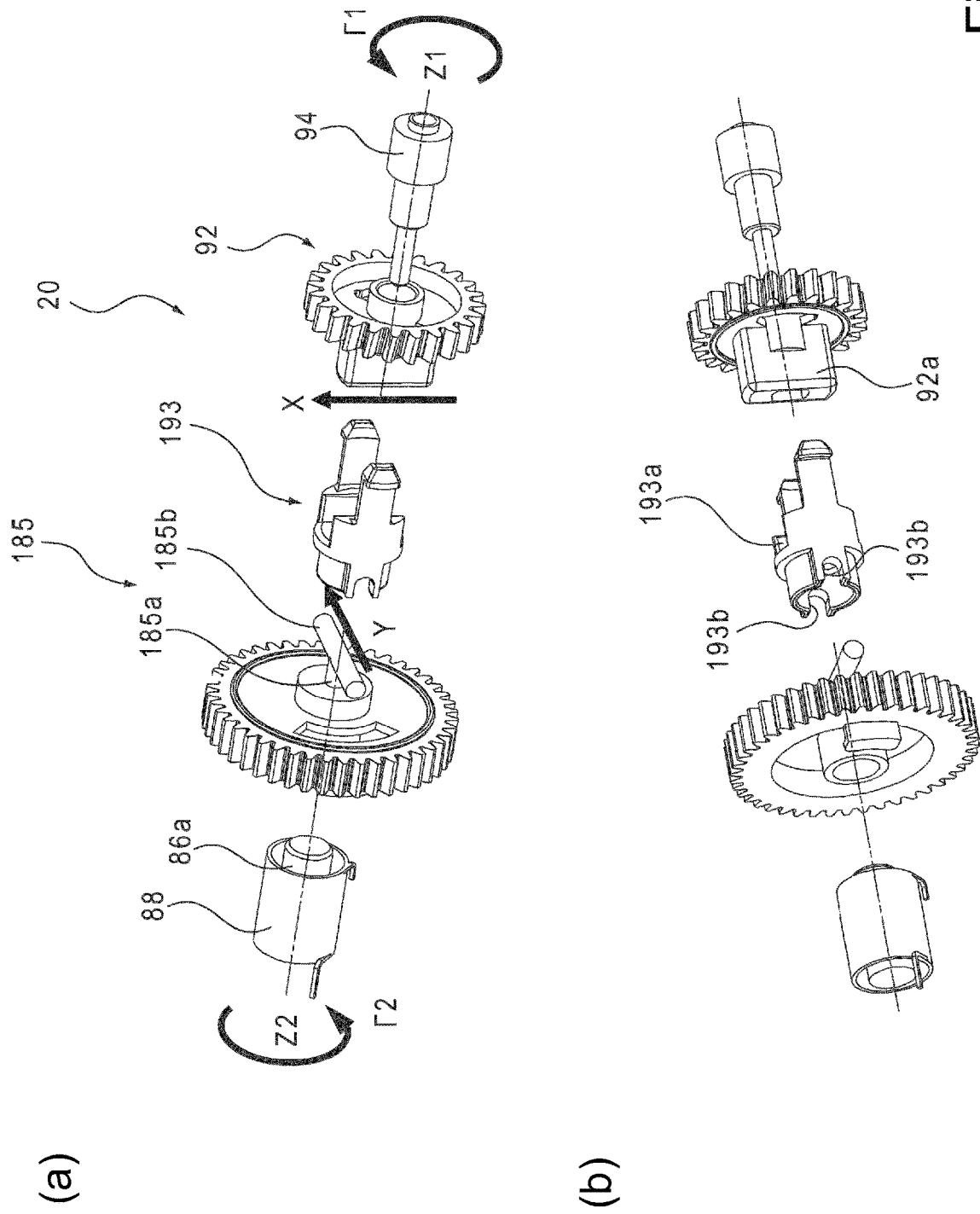

Parts (a) and (b) of FIG. 8 are exploded perspective views showing a coupling portion in Embodiment 2.

Figure 9:
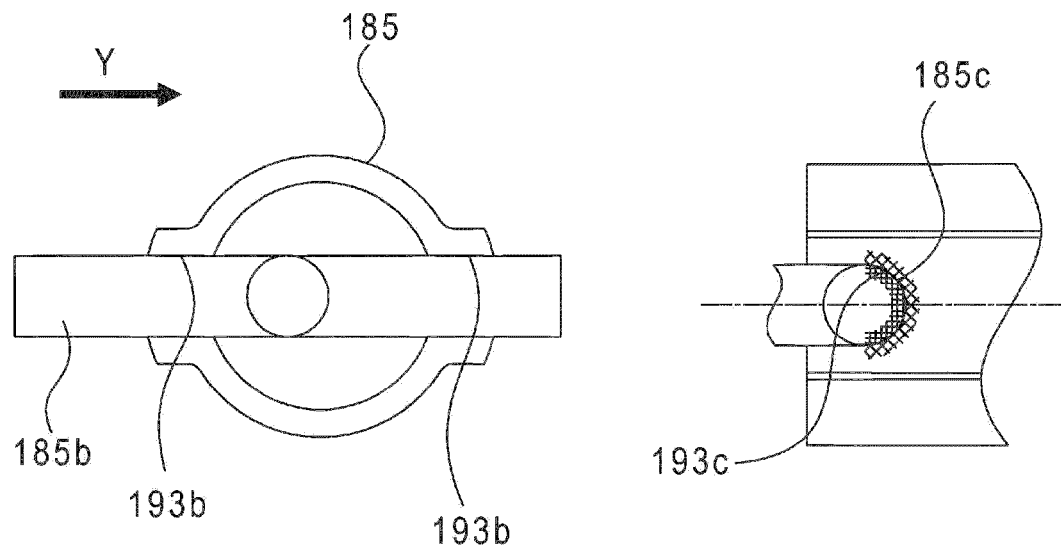
Figure 9:
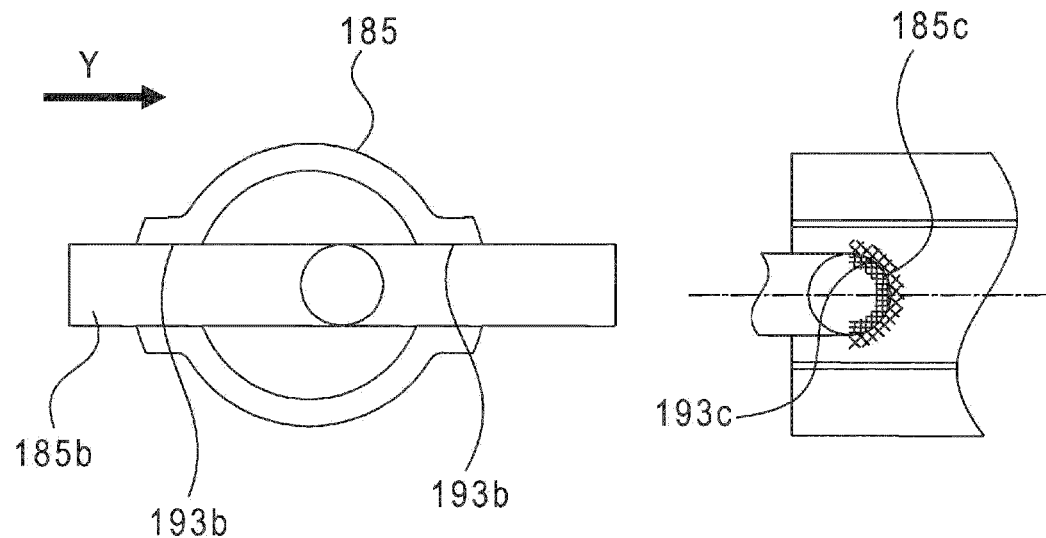

Parts (a) and (b) of FIG. 9 are schematic views showing a principle of eccentricity absorption of the coupling portion with respect to the Y direction.

Figure 10:
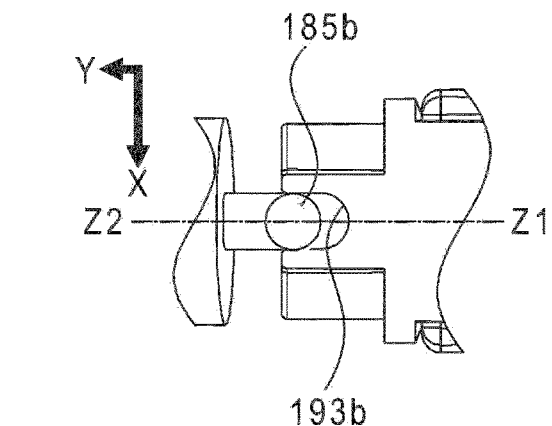
Figure 10:
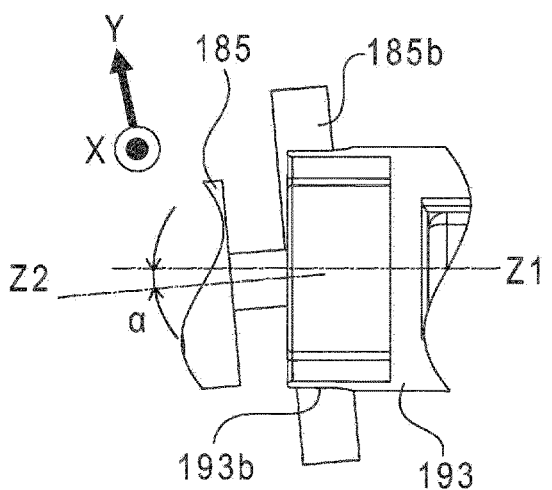
Figure 10:
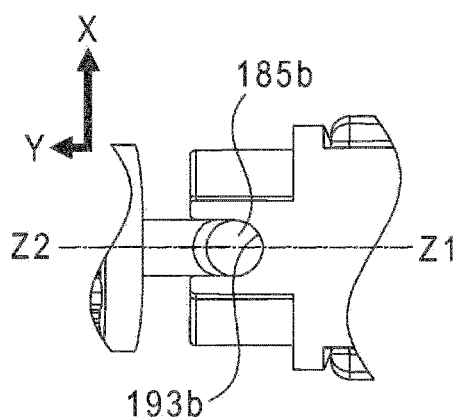
Figure 10:
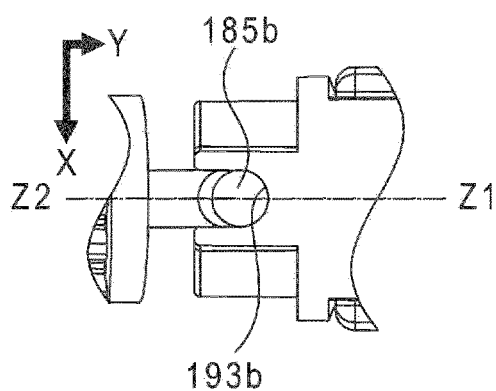
Figure 10:
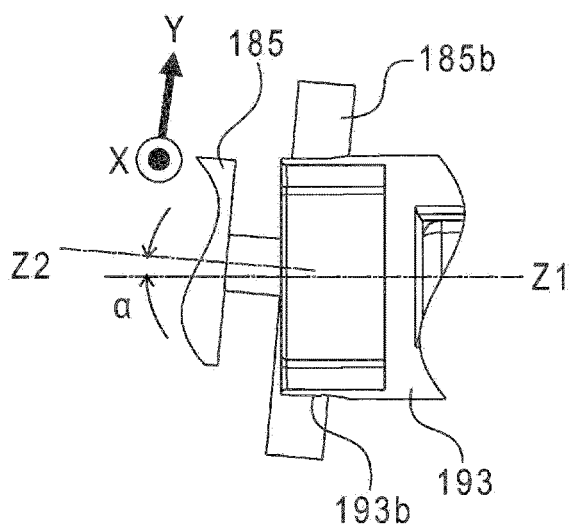
Figure 10:
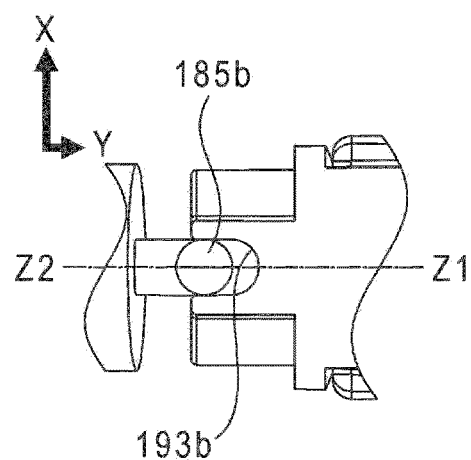

Parts (a) and (b) of FIG. 10 are schematic views showing a principle of deviation angle absorption about an axis extending the X direction.

Figure 11:
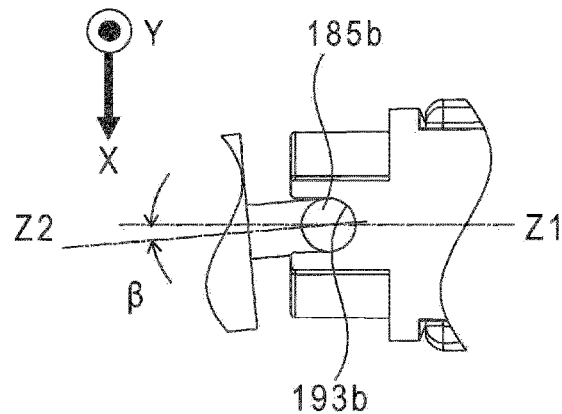
Figure 11:
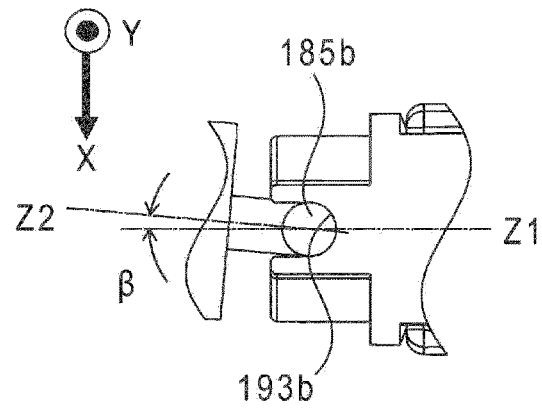
Figure 11:
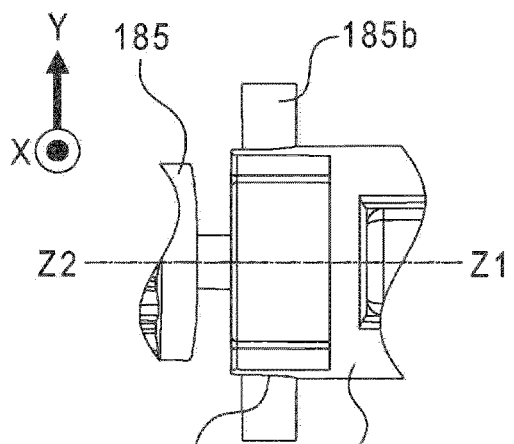
Figure 11:
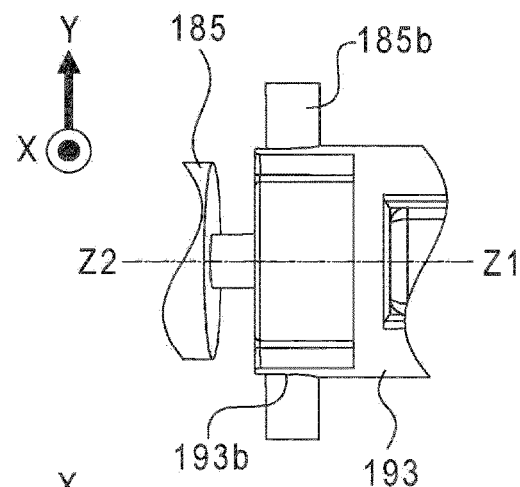
Figure 11:
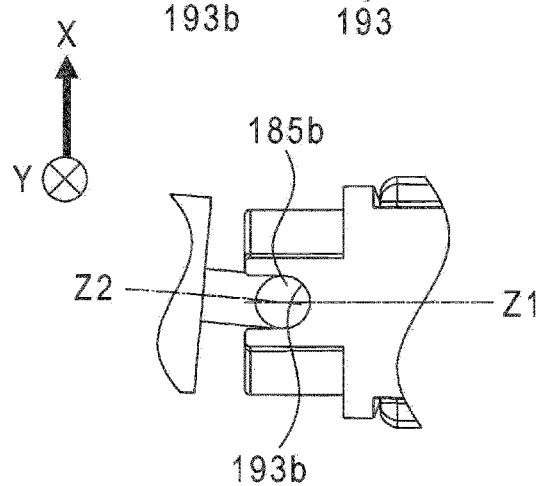
Figure 11:
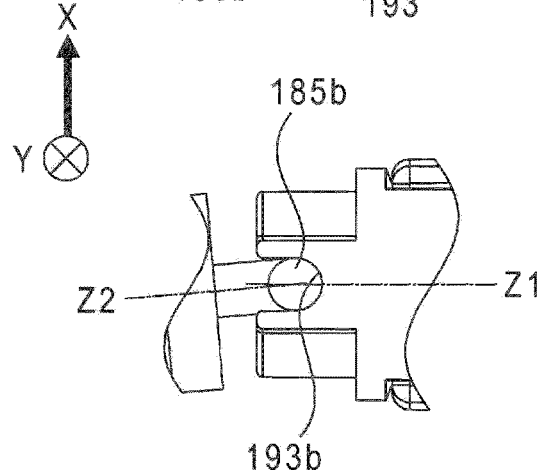

Parts (a) and (b) of FIG. 11 are schematic views showing a principle of deviation angle absorption about an axis extending in the Y direction.

Figure 12:
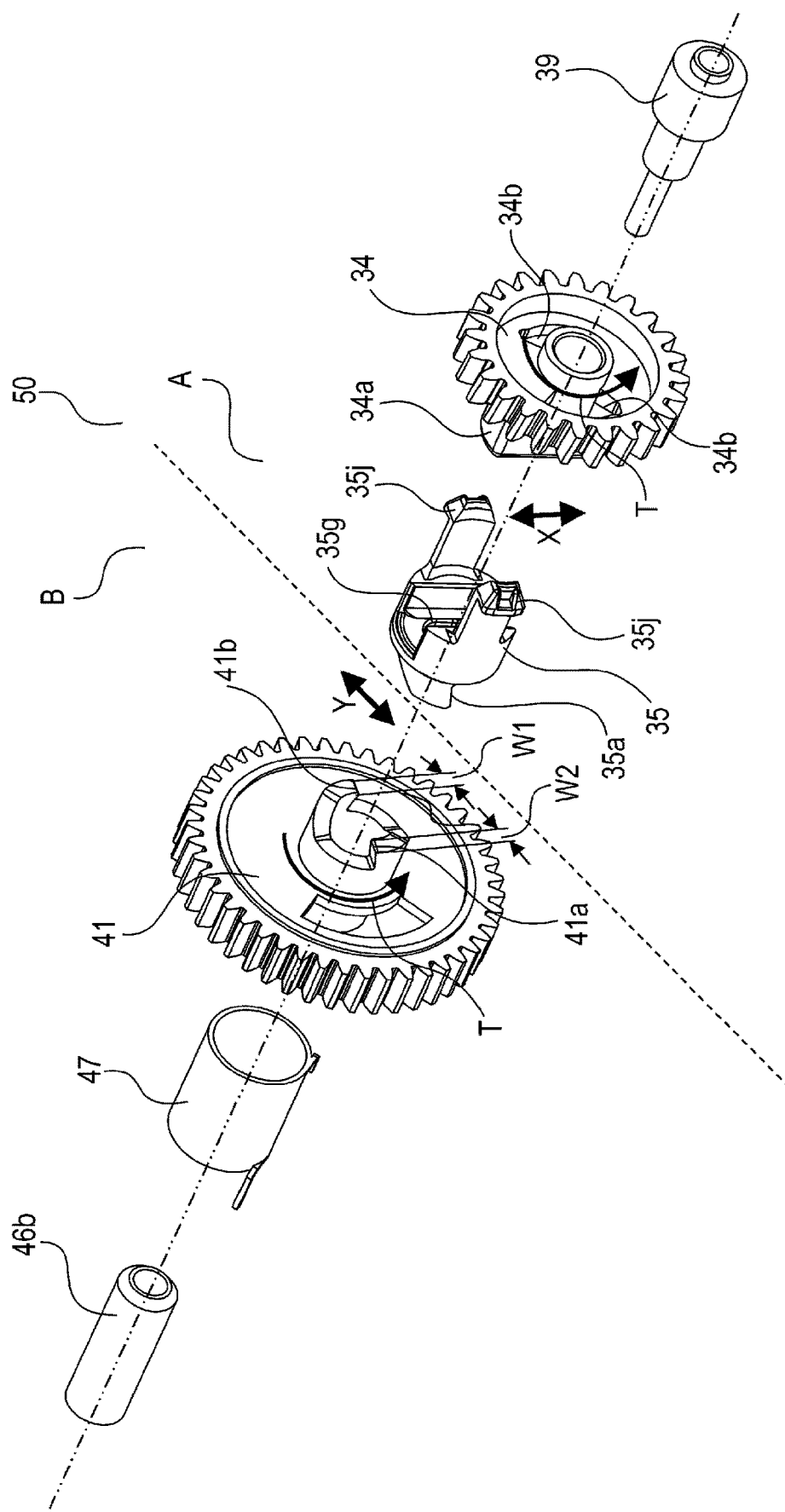

FIG. 12 is an exploded perspective view showing a coupling portion in Embodiment 3.

Figure 13:
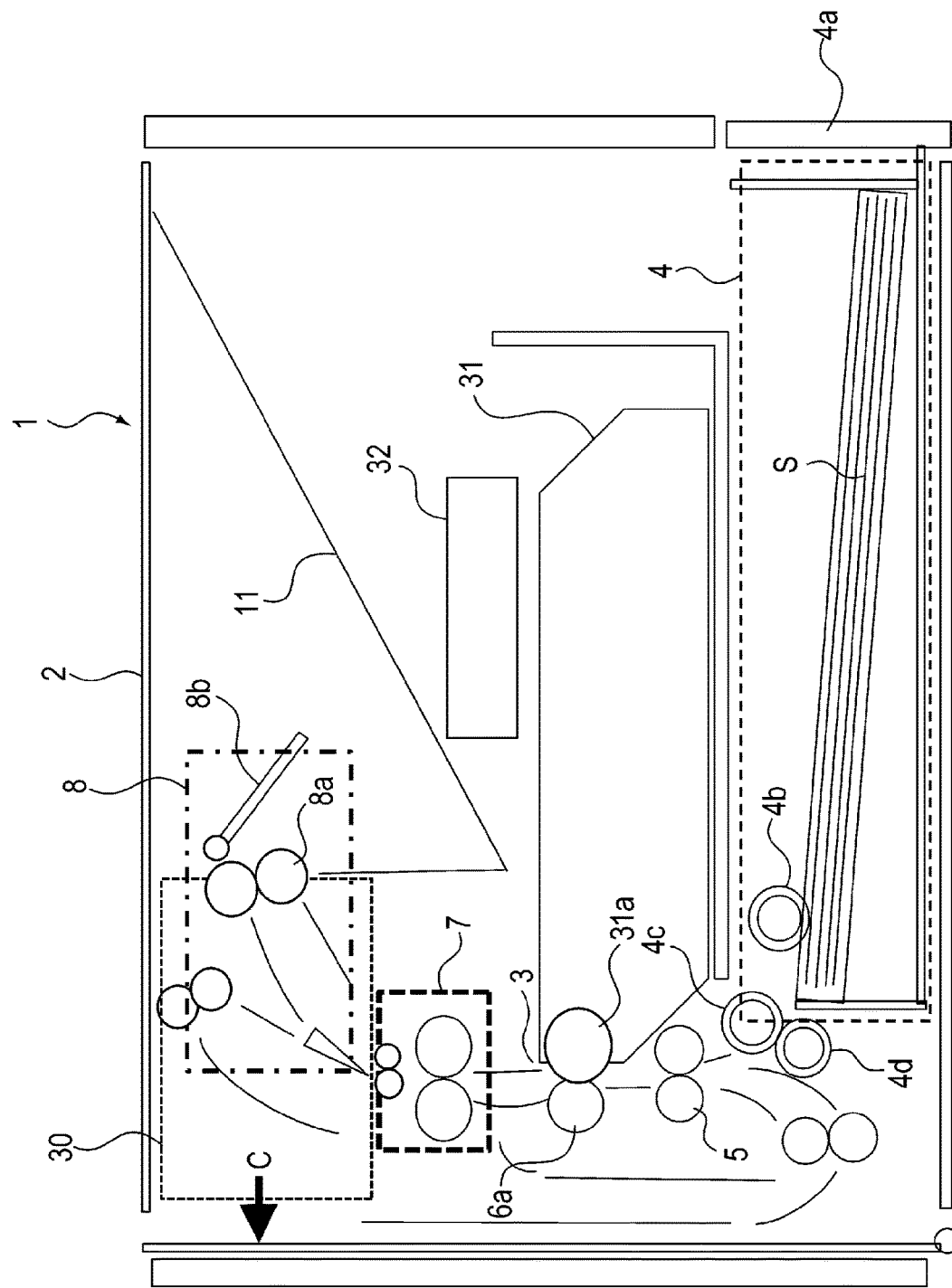

FIG. 13 is a schematic sectional view showing a general structure of a laser printer as an example of an image forming apparatus.

Figure 14:
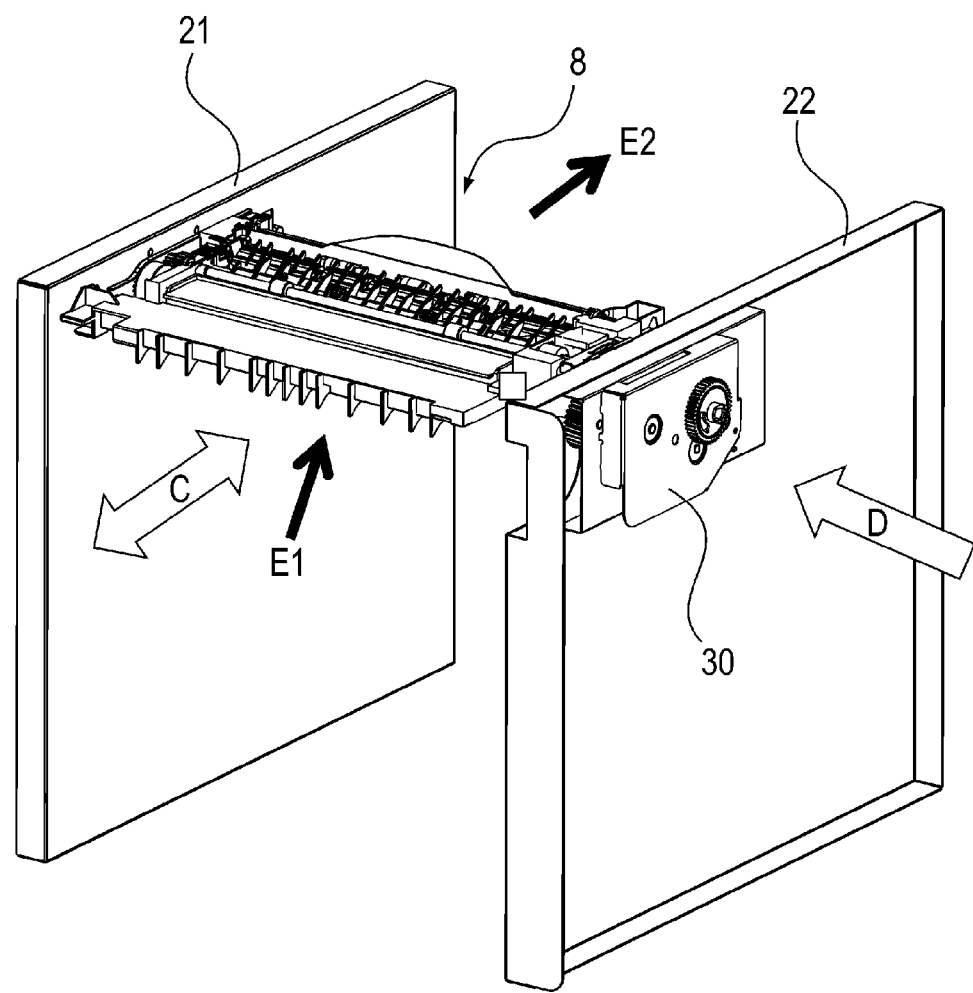

FIG. 14 is a perspective view showing an arrangement of a discharging unit and a driving unit.

Figure 15:
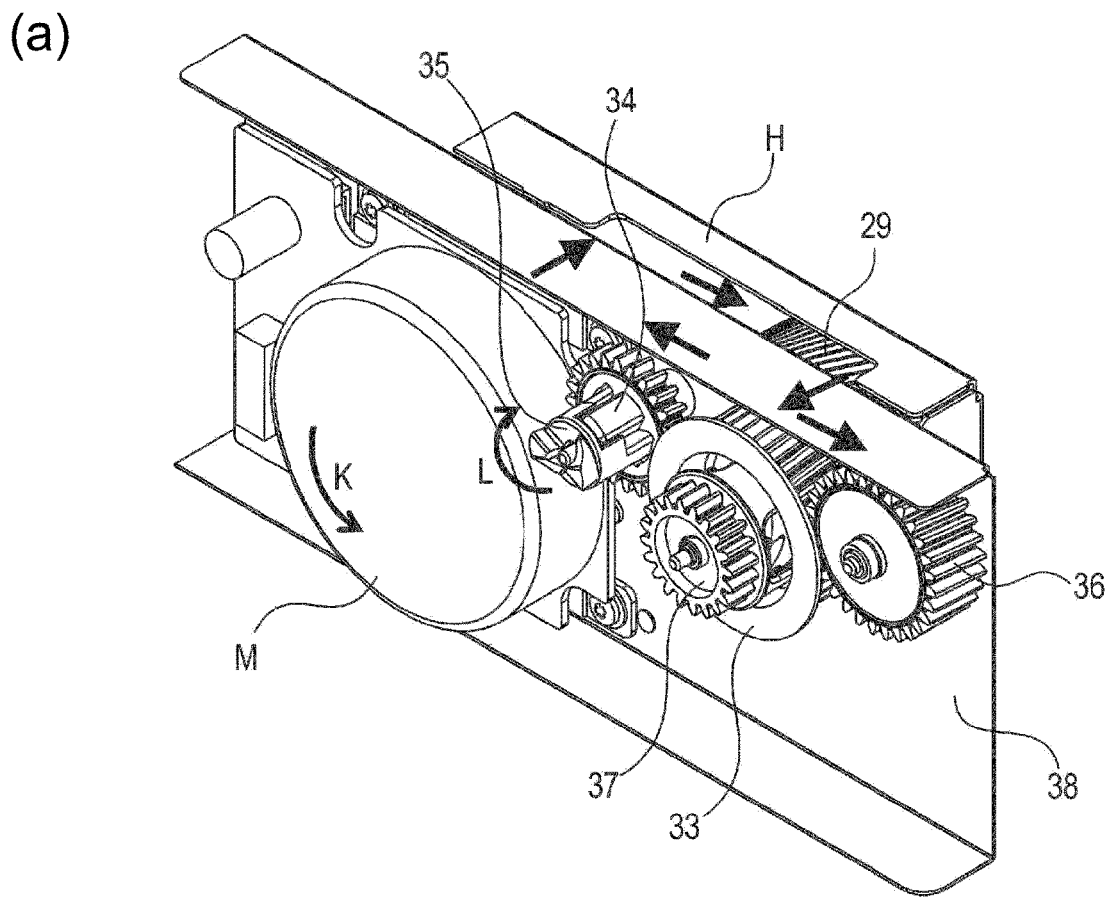
Figure 15:
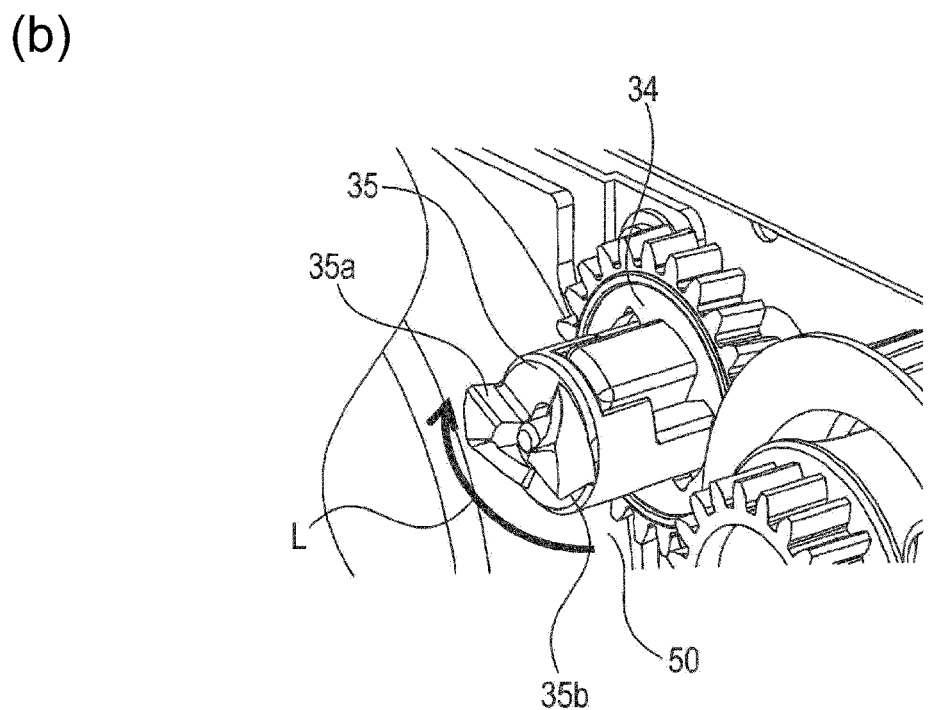

Parts (a) and (b) of FIG. 15 are schematic views for illustrating a discharging unit and a drive transmitting portion, respectively.

Figure 16:
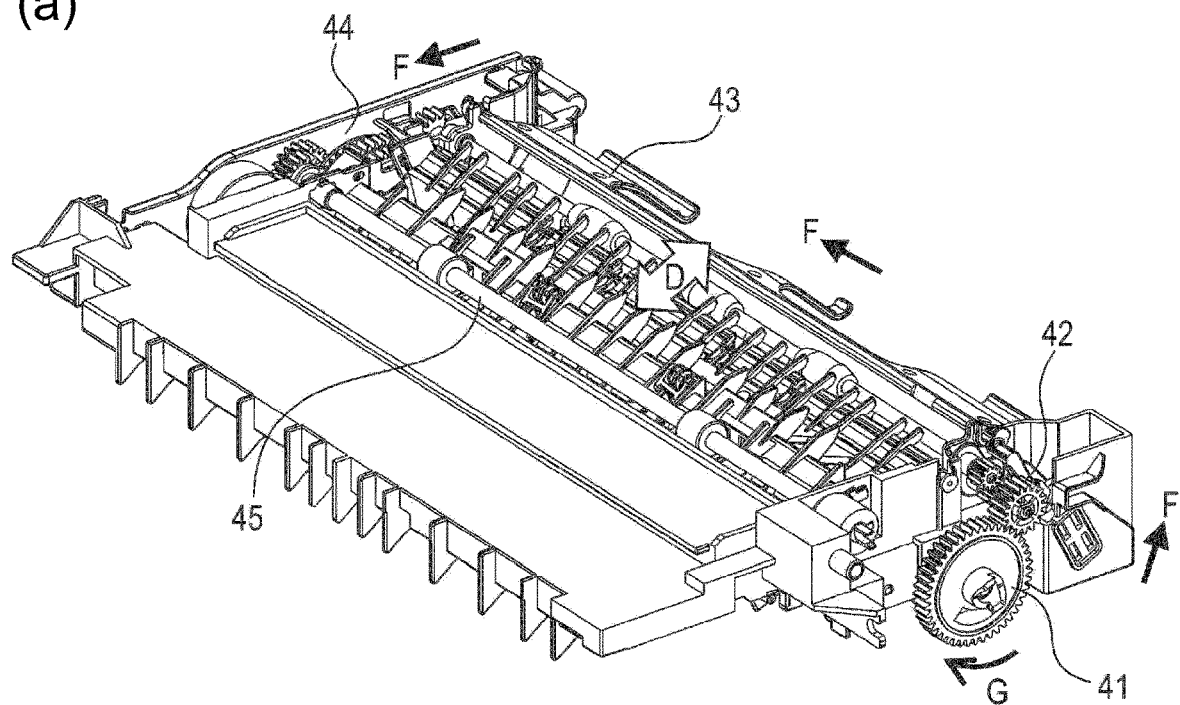
Figure 16:
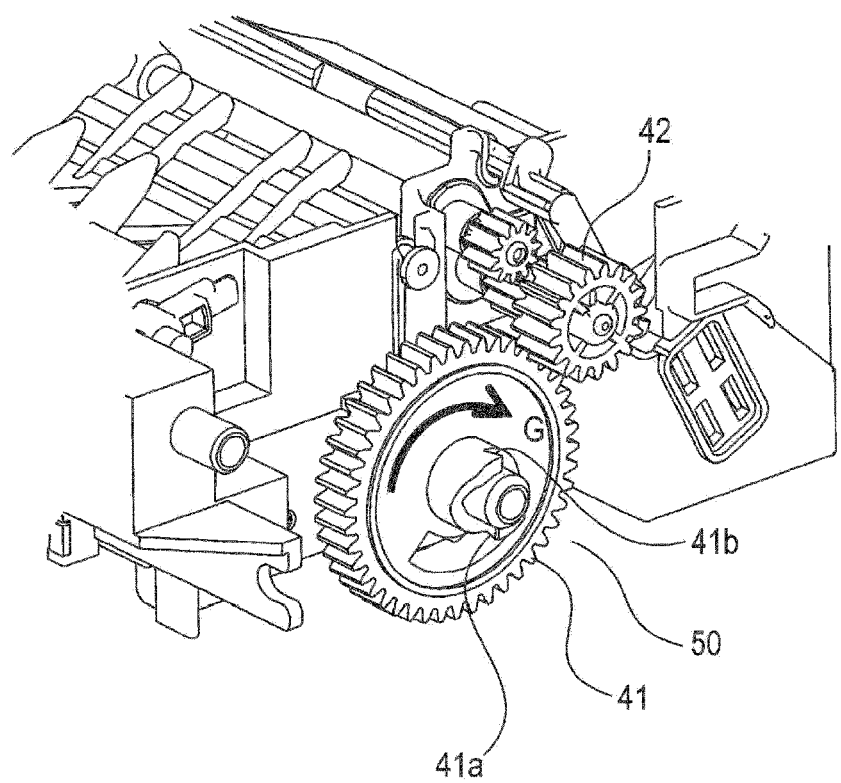

Parts (a) and (b) of FIG. 16 are schematic views for illustrating a driving unit and a drive transmitting portion, respectively.

Figure 17:
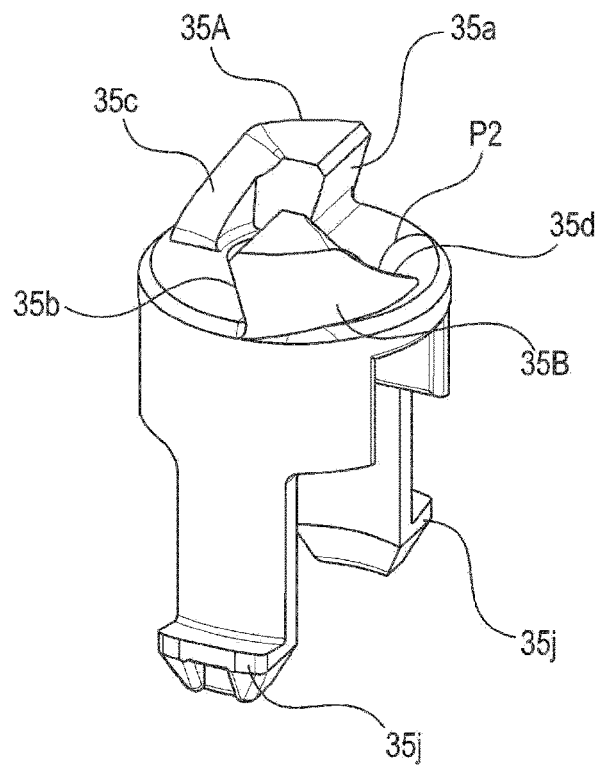
Figure 17:
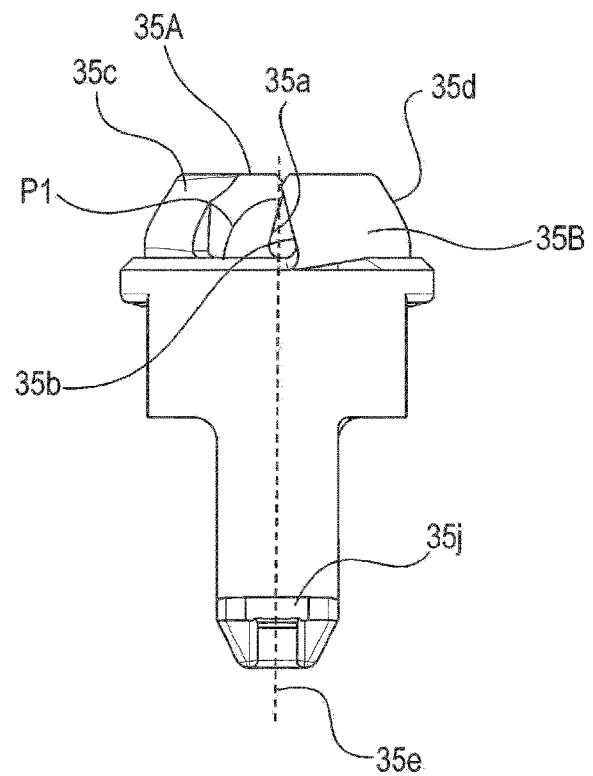

Parts (a) and (b) of FIG. 17 are schematic views for illustrating a shape of a coupling ratchet.

Figure 18:
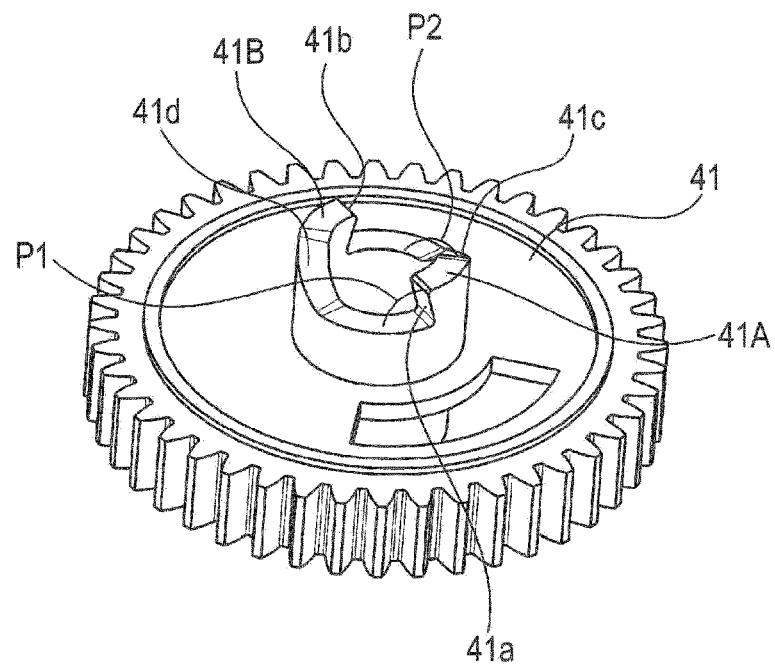
Figure 18:
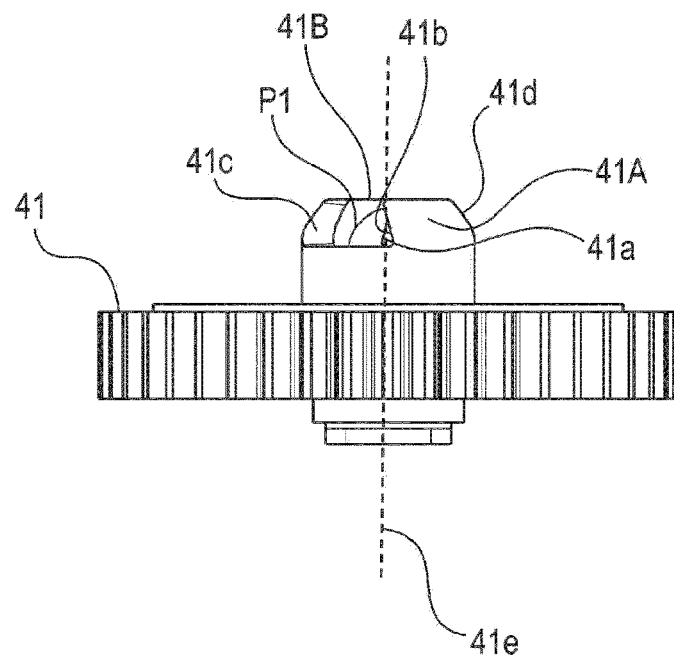

Parts (a) and (b) of FIG. 18 are schematic views for illustrating a shape of an input gear.

Figure 19:
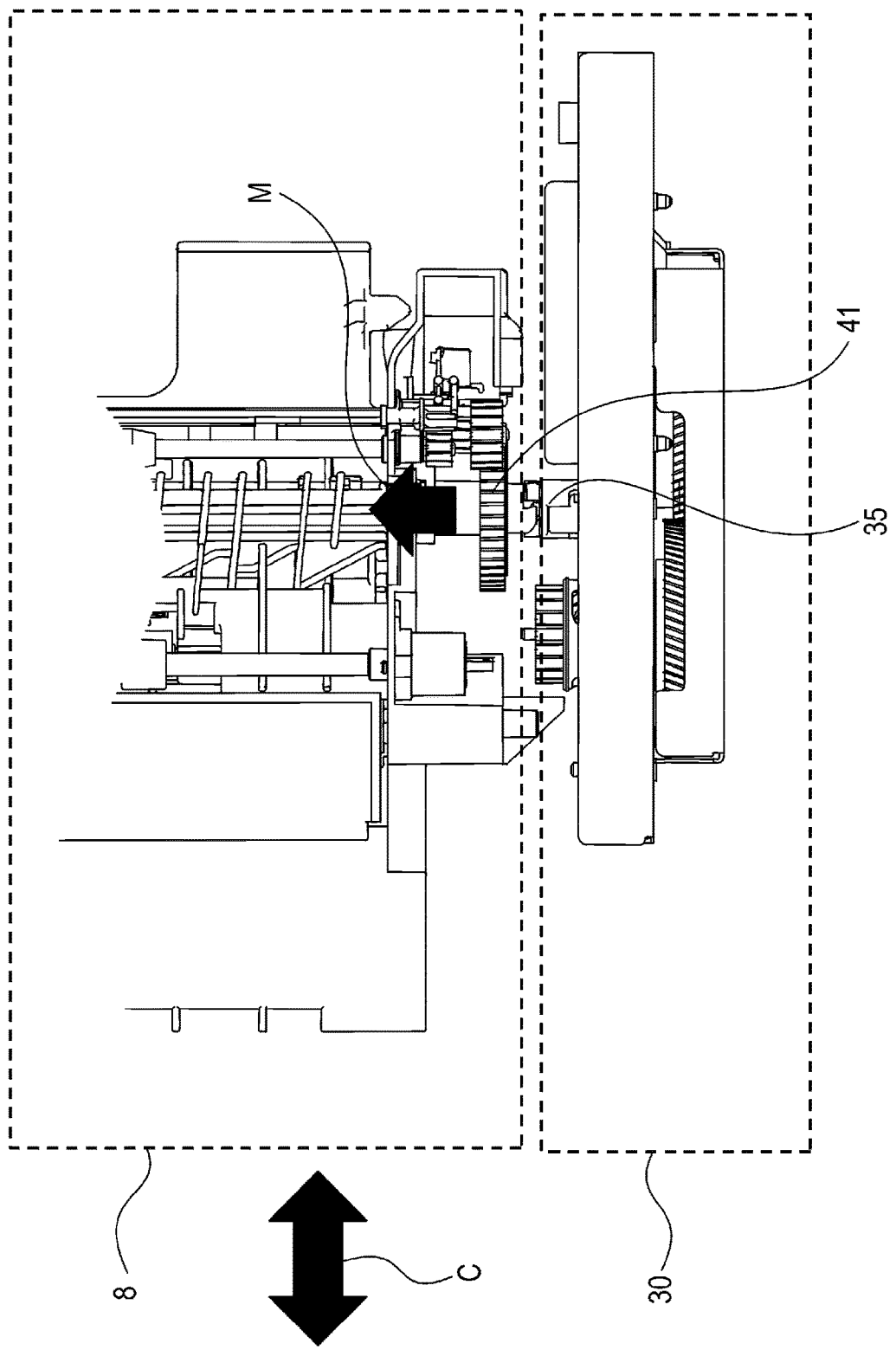

FIG. 19 is a schematic view for illustrating an engaging portion in the case where the engaging portion is seen from above the image forming apparatus.

Figure 20:
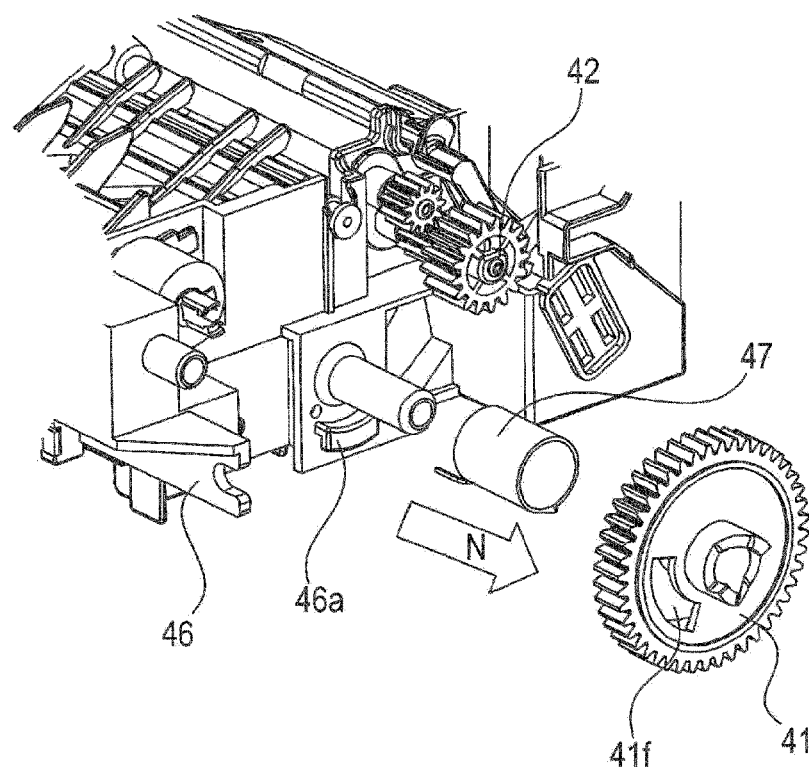
Figure 20:
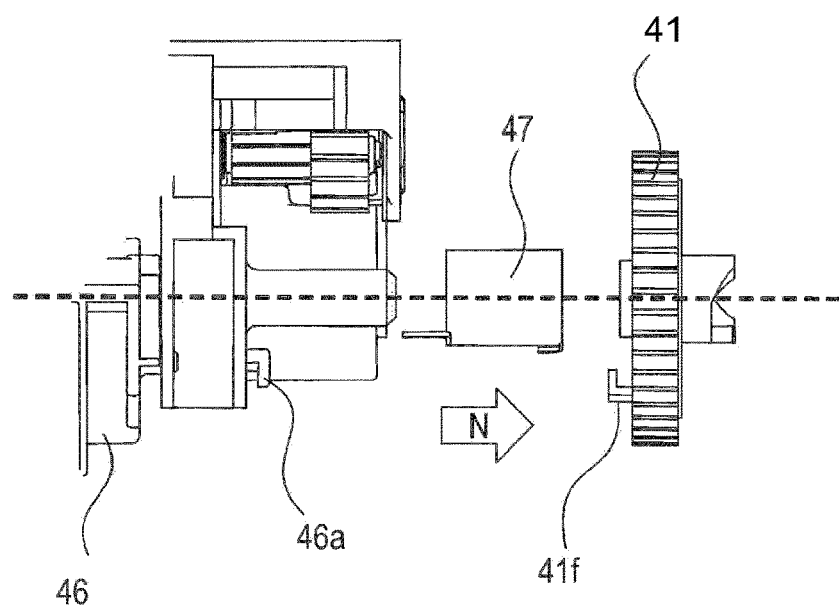
Figure 21:
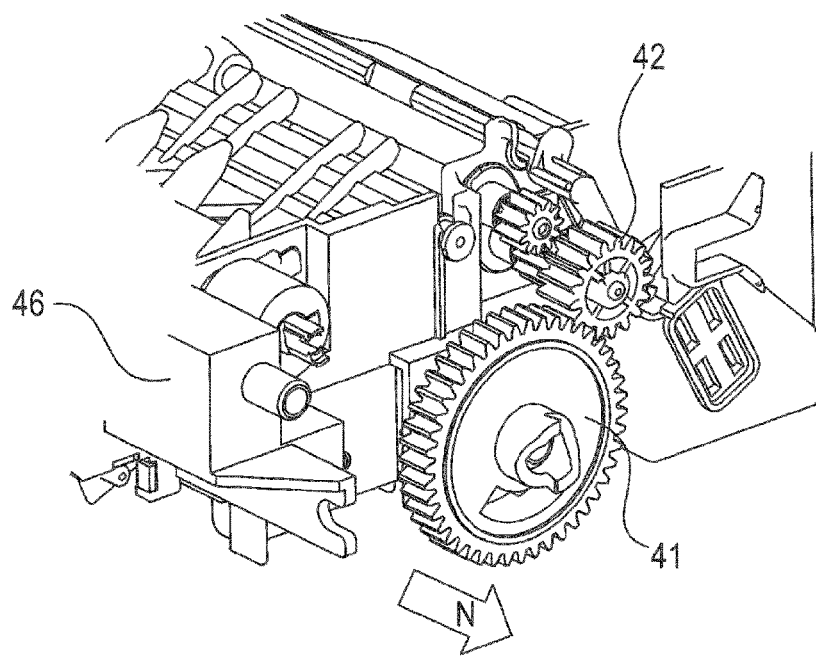
Figure 21:
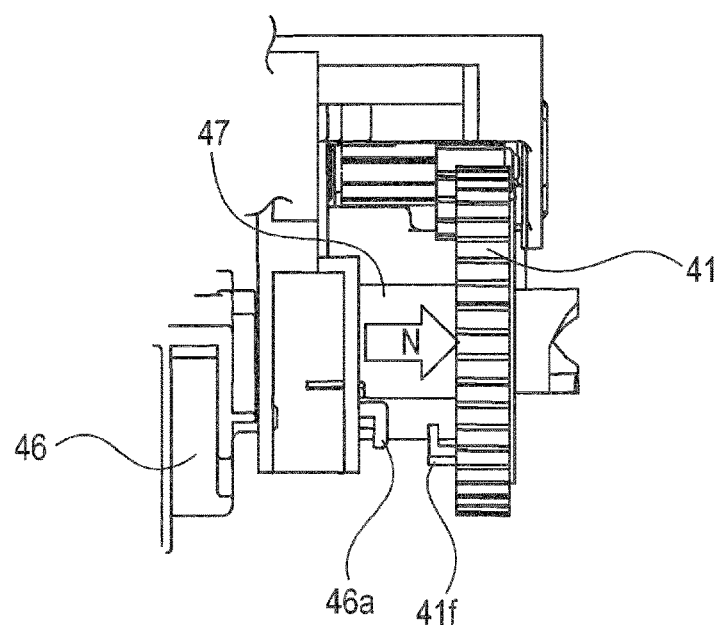
Figure 22:
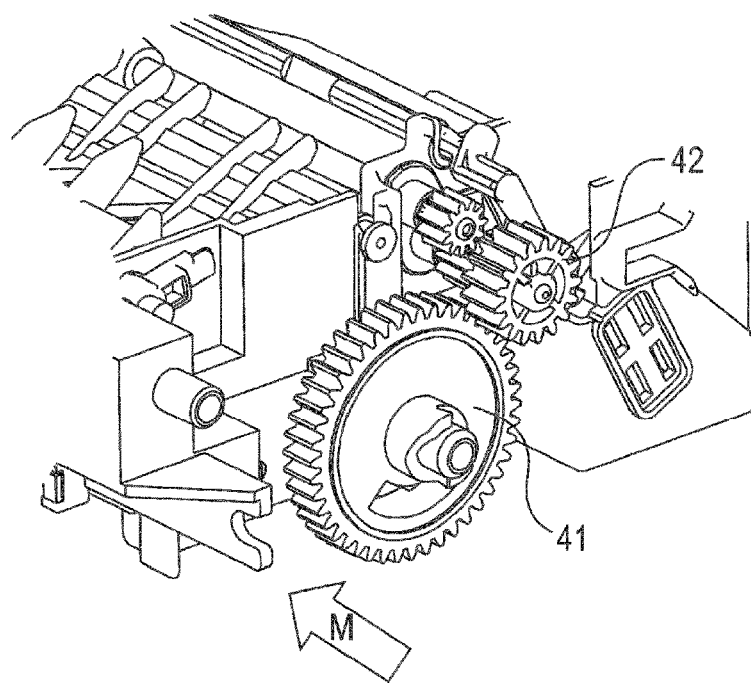
Figure 22:
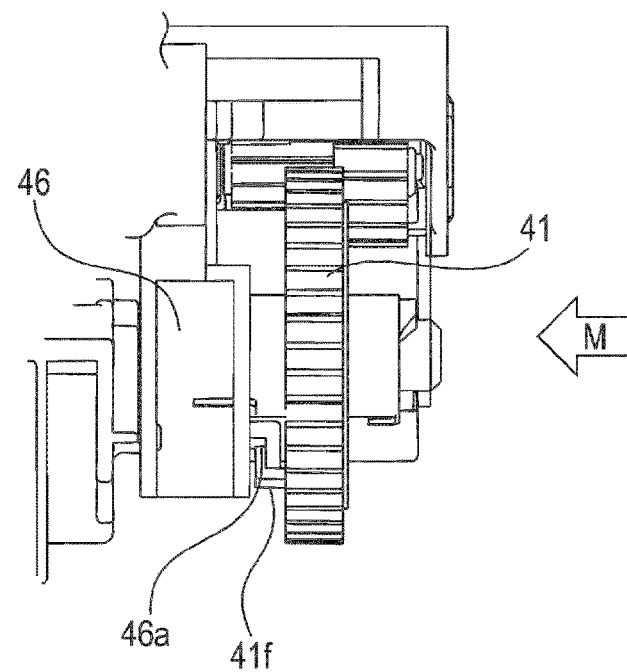

Parts (a) and (b) of FIG. 20, parts (a) and (b) of FIG. 21, and parts (a) and (b) of FIG. 22 are schematic views for illustrating a structure and a state of the input gear of the discharging unit.

Figure 23:
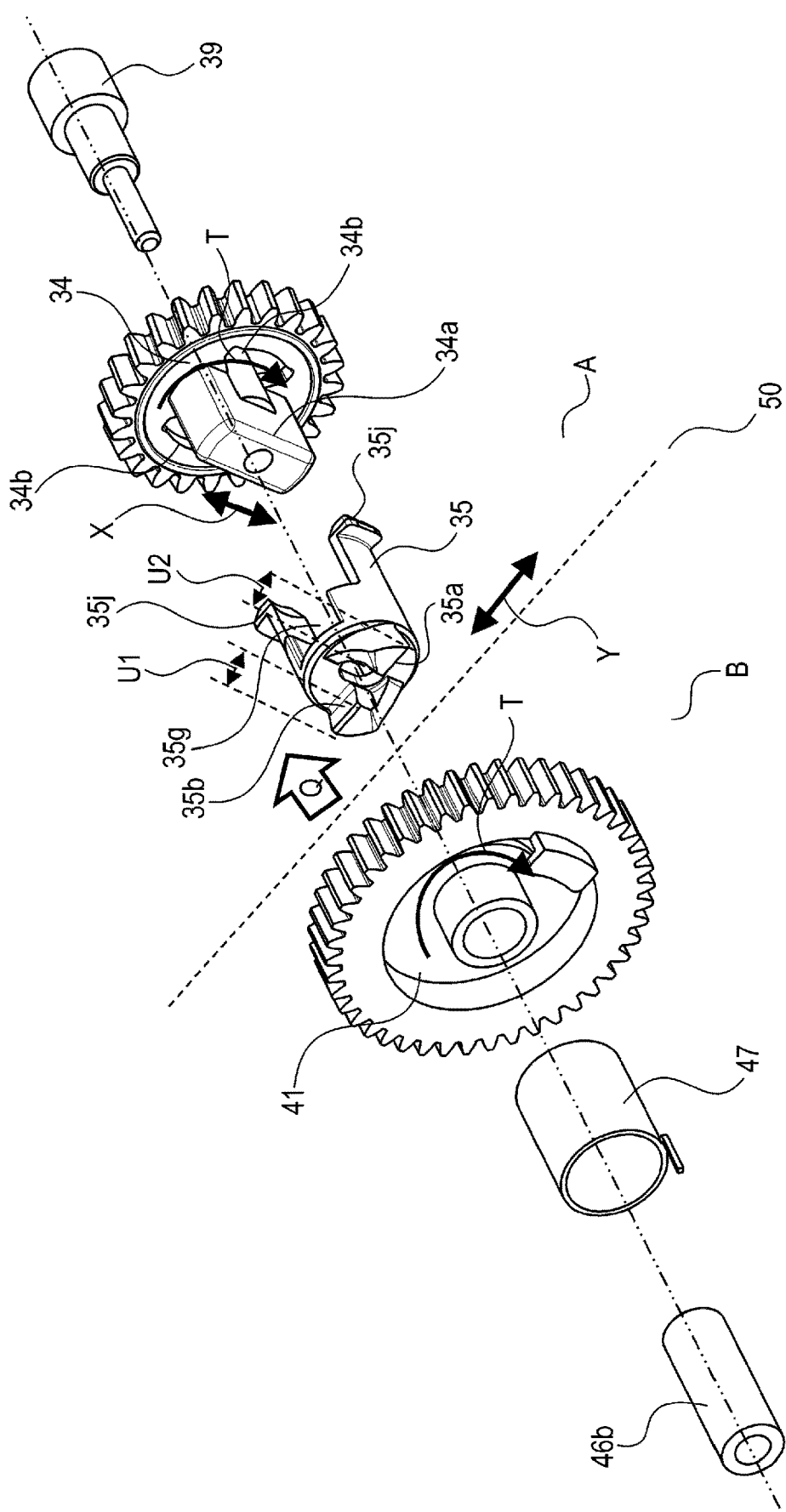

FIG. 23 is an exploded perspective view for illustrating a coupling portion in Embodiment 3.

Figure 24:
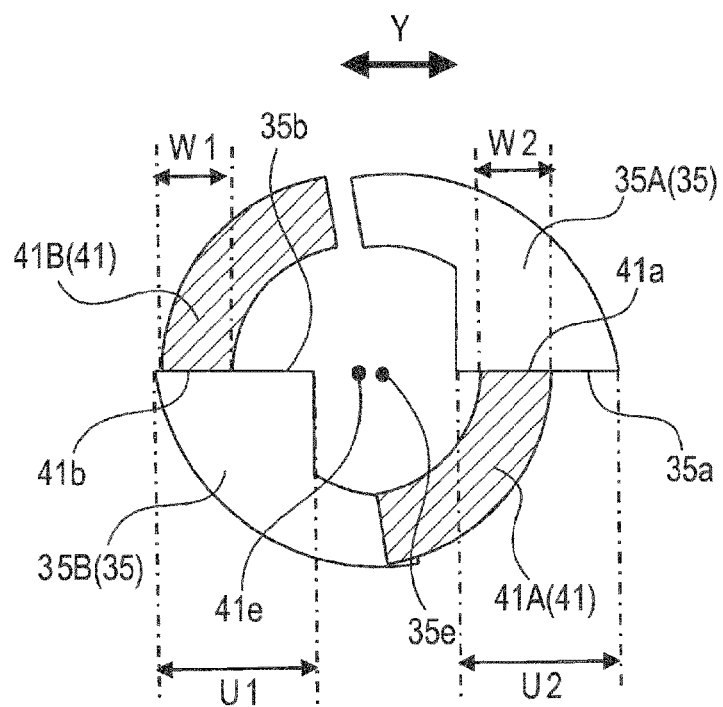
Figure 24:
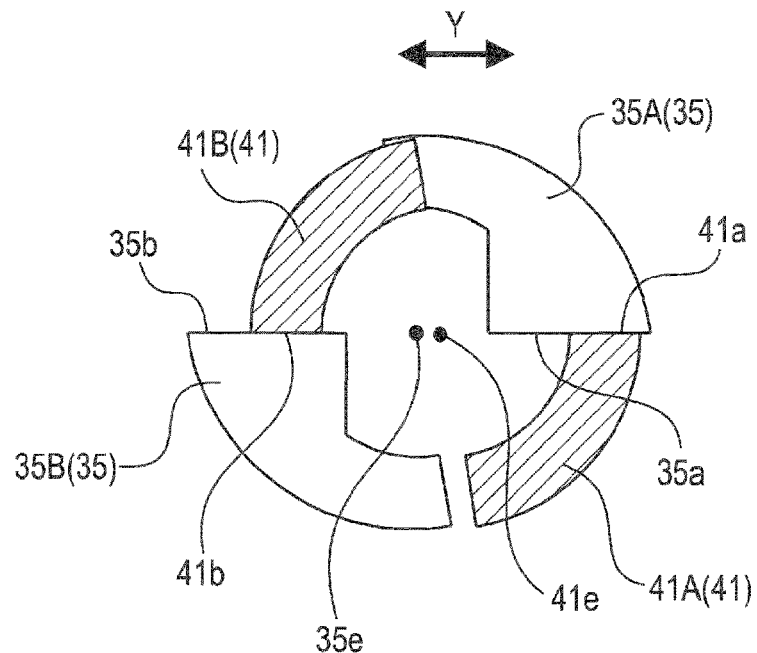

Parts (a) and (b) of FIG. 24 are schematic views for illustrating slide movement of a coupling ratchet and an input gear.

Figure 25:
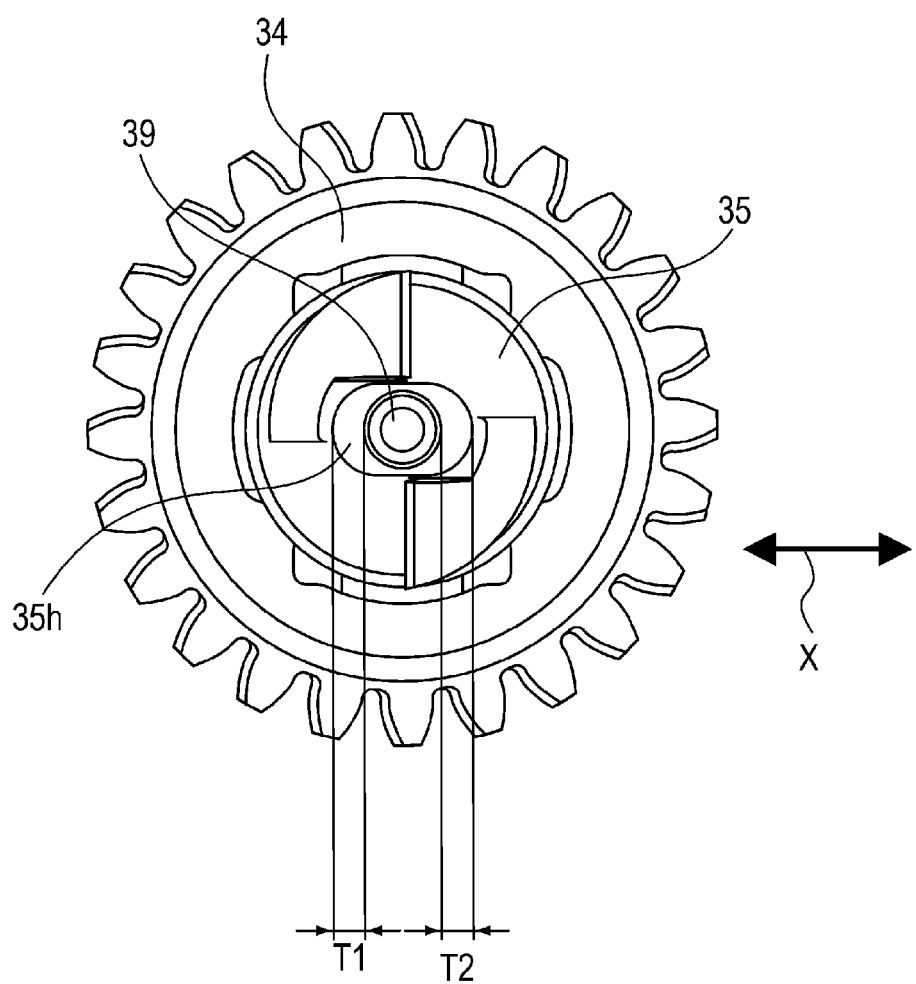

FIG. 25 is a schematic view for illustrating a slide of the coupling ratchet.

Figure 26:
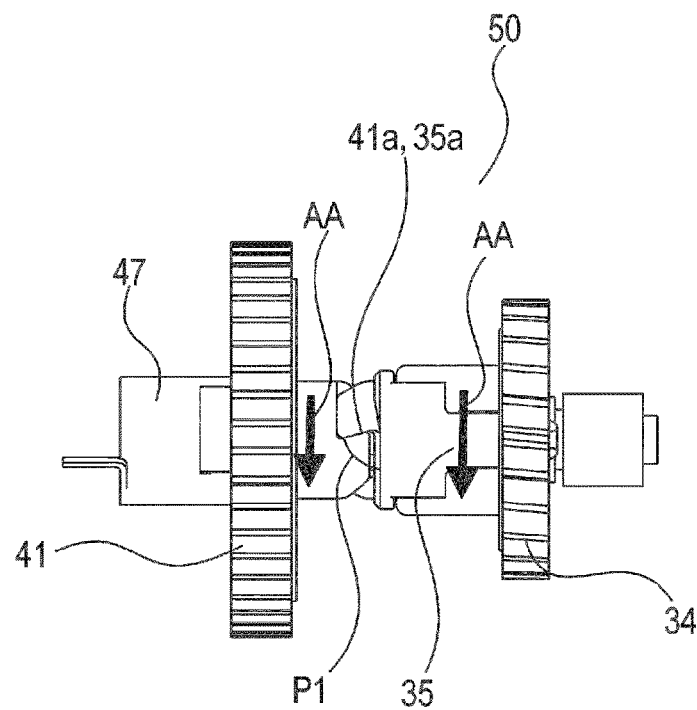
Figure 26:
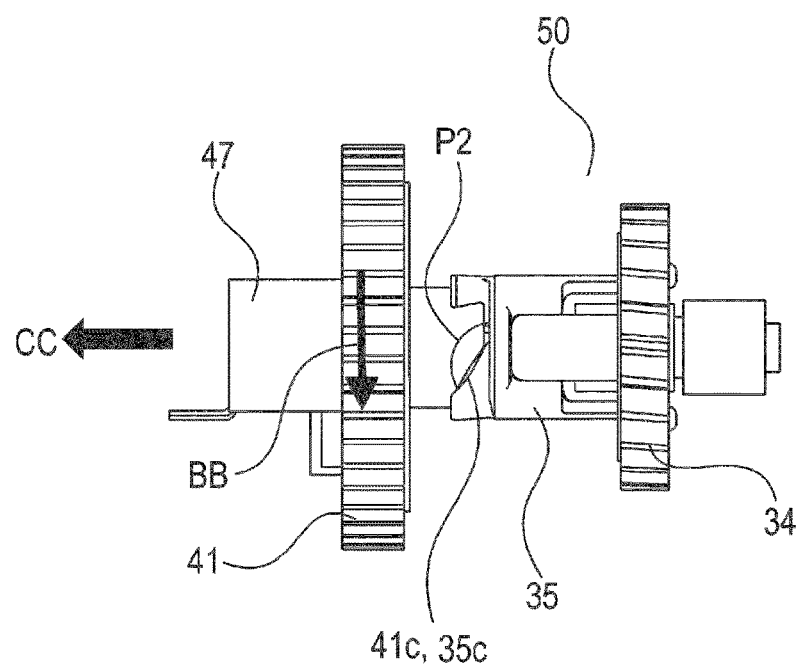

Parts (a) and (b) of FIG. 26 are schematic views for illustrating engagement and retraction between coupling portions.

Figure 27:
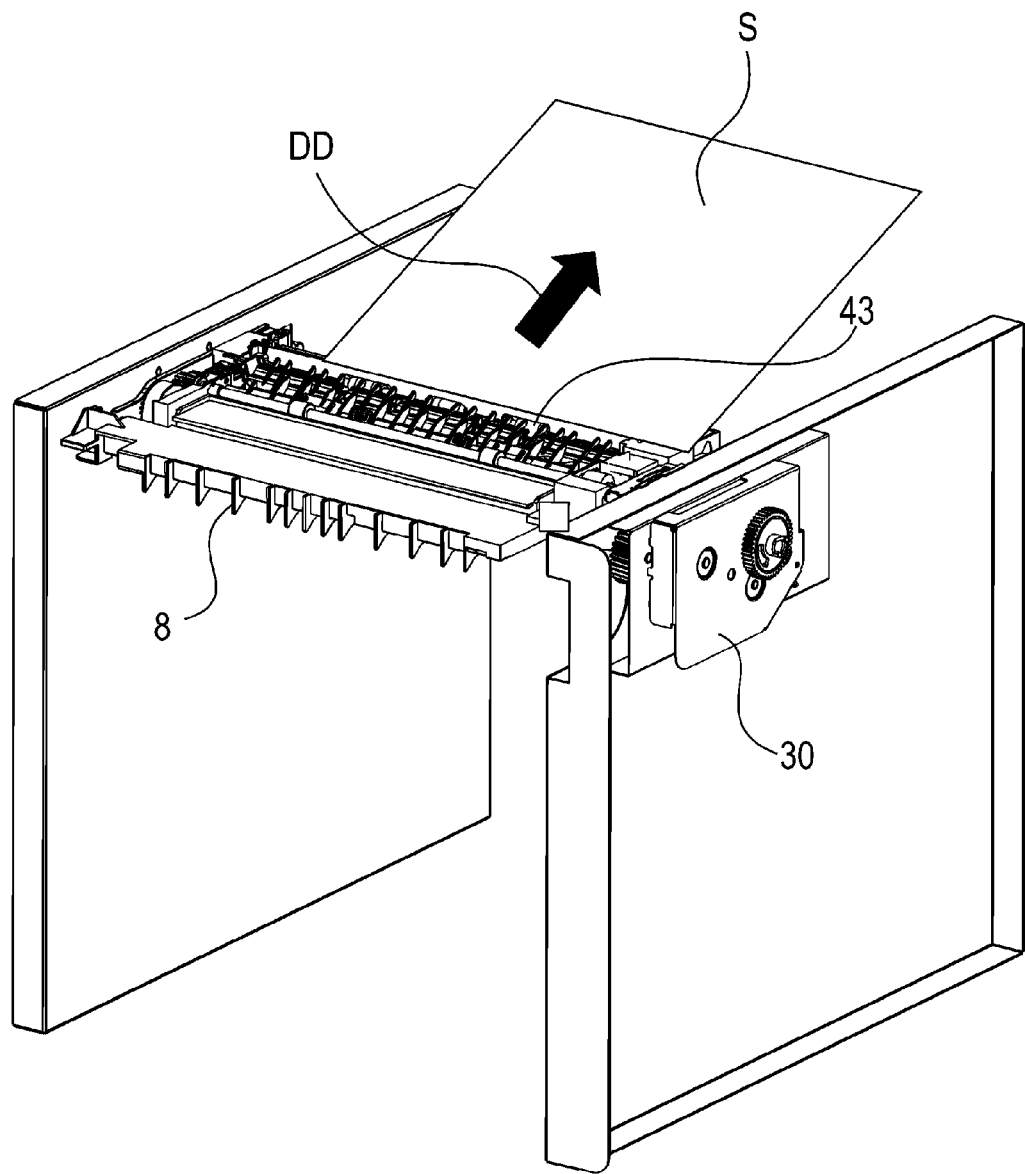

FIG. 27 is a schematic view for illustrating clearance of a sheet jammed between a discharging roller pair.

Figure 28:
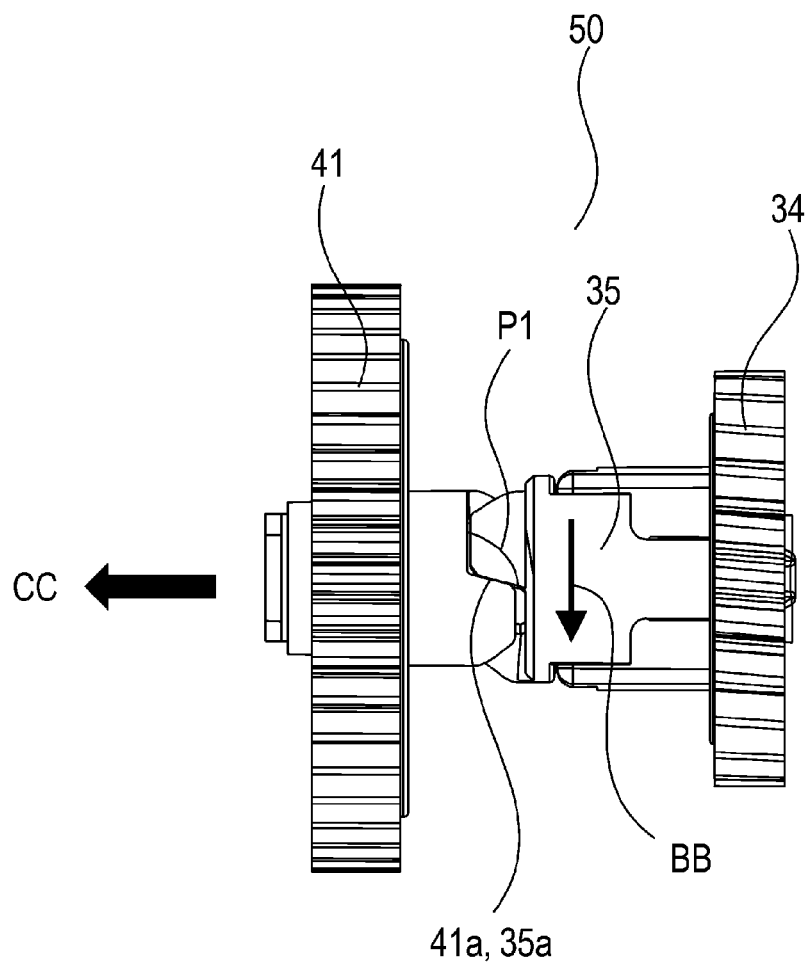

FIG. 28 is a schematic view for illustrating coupling portions in Embodiment 4.

Figure 29:
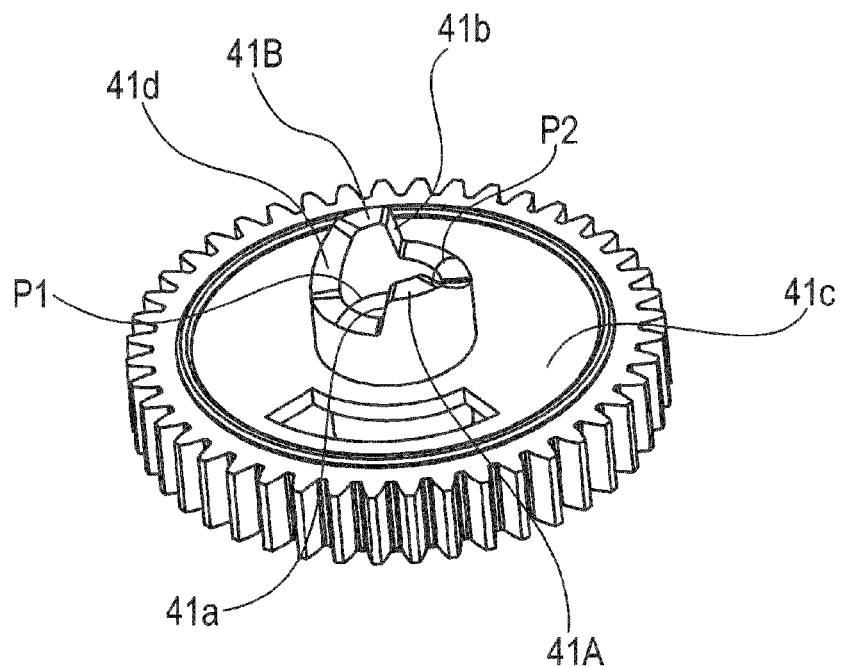
Figure 29:
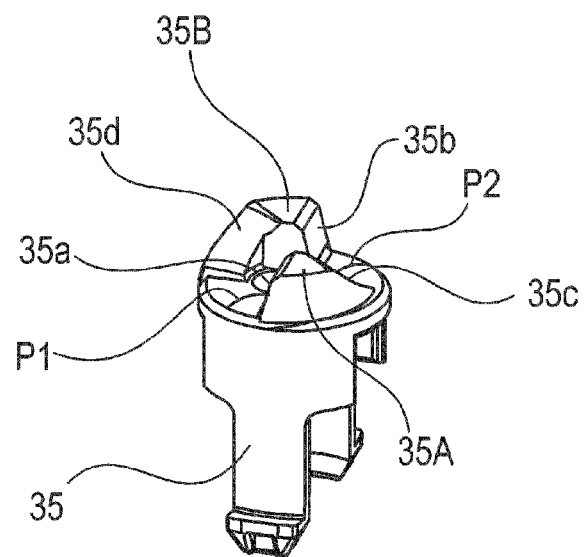

Parts (a) and (b) of FIG. 29 are schematic views for illustrating coupling portions in Embodiment 2.

Figure 30:
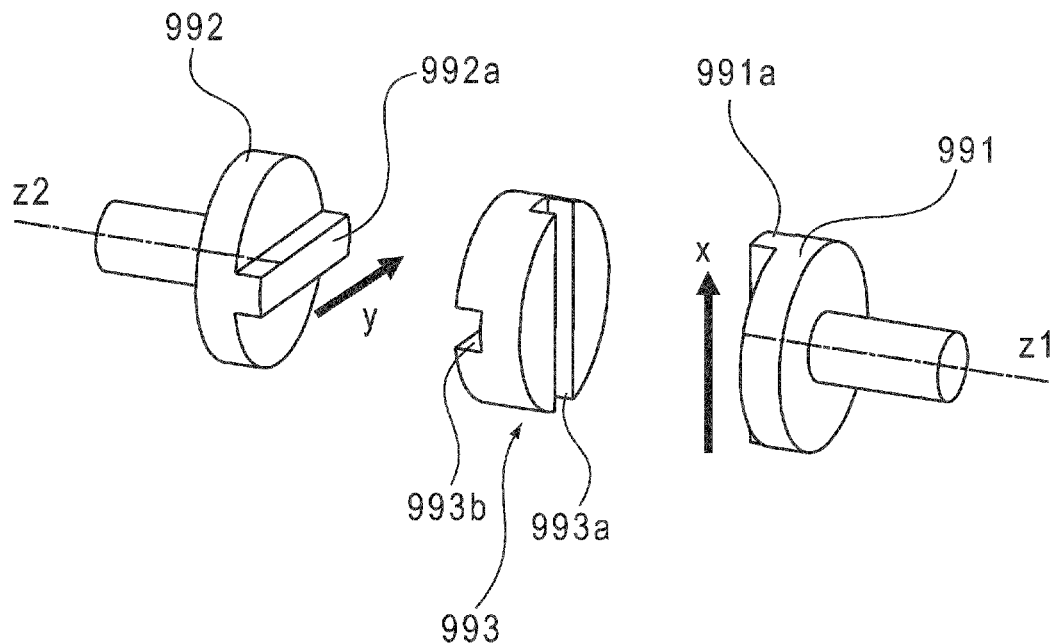
Figure 30:
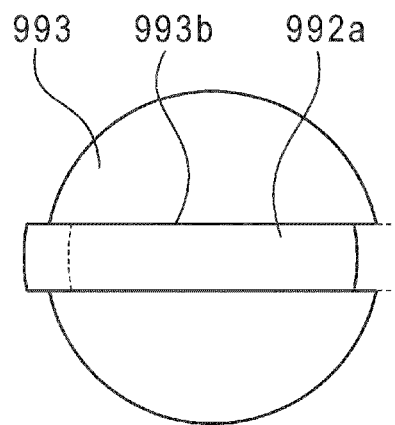
Figure 30:
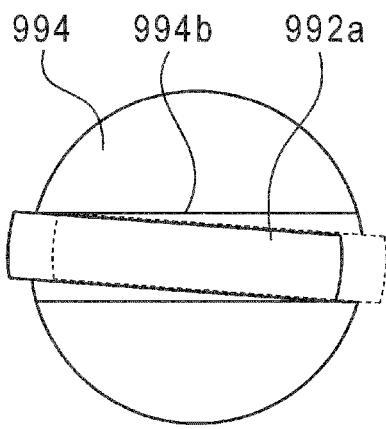

Parts (a), (b) and (c) of FIG. 30 are schematic views for illustrating a structure of a conventional Oldham's coupling.

Figure 31:
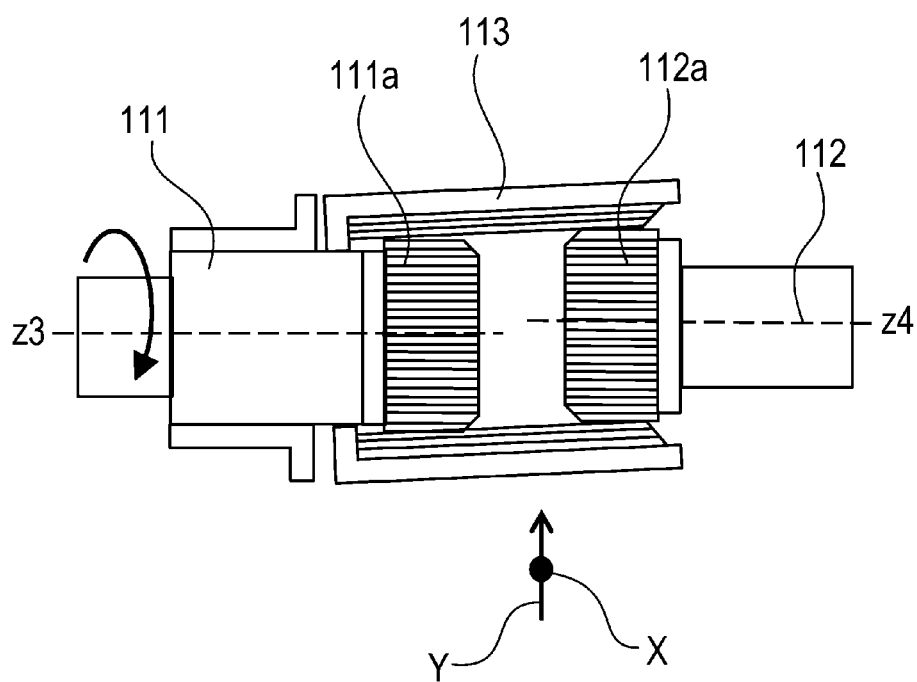

FIG. 31 is a schematic view for illustrating a structure for absorbing eccentricity by using conventional gears.

DESCRIPTION OF EMBODIMENTS

Embodiments of the present invention will be specifically described with reference to the drawings. Dimensions, materials, shapes and relative arrangements of constituent elements described in the following embodiments should be appropriately be changed depending on structures and various conditions of devices (apparatuses) to which the present invention is applied. Accordingly, the scope of the present invention is not intended to be limited to the following embodiments unless otherwise specified.

Embodiment 1

(Image Forming Apparatus)

Figure 1:
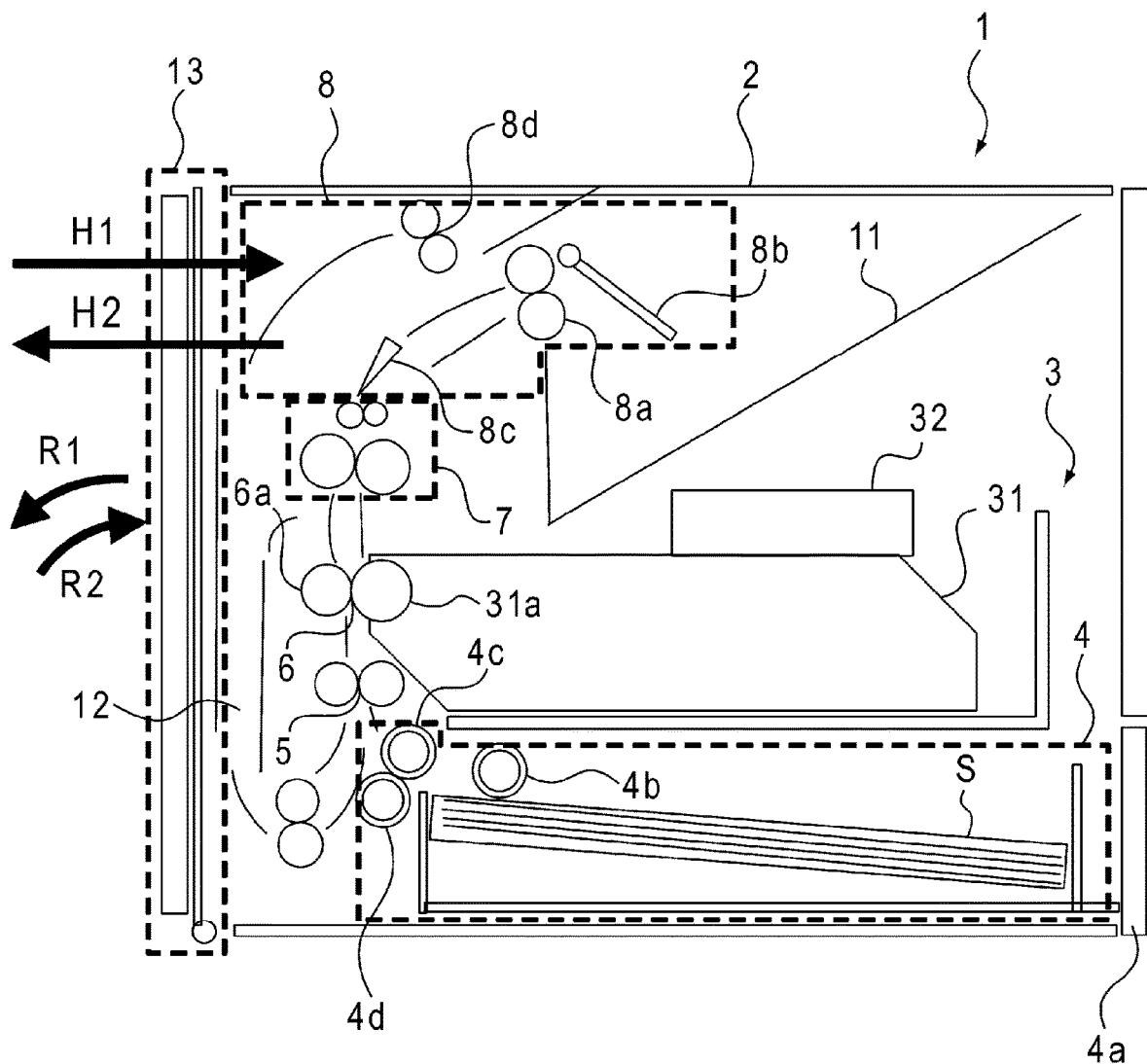
FIG. 1 is a schematic sectional view showing a general structure of a printer to which a unit is provided so as to be detachably mountable.

FIG. 1 is a schematic view showing a general structure of a laser printer 1 as an example of an image forming apparatus according to Embodiment 1.

In FIG. 1, the laser printer 1 includes a laser printer main assembly (hereinafter, referred to as an apparatus main assembly) 2 including portions other than a unit detachably mountable to the laser printer 1. The laser printer 1 includes an image forming portion 3 for forming an image by an electrophotographic type, a sheet feeding device 4 for feeding a sheet S to the image forming portion 3, a fixing unit 7 for fixing the image on the sheet S discharged from the image forming portion 3, and the like.

The image forming portion 3 includes a cartridge unit 31 including a photosensitive drum 31a as an image bearing member and includes a laser scanner 32 for exposing the photosensitive drum 31a to light. During image formation, the photosensitive drum 31a is exposed to light by the laser scanner 32, so that a latent image is formed on a surface of the photosensitive drum 31a, and thereafter, the latent image is developed and thus a toner image is formed on the surface of the photosensitive drum 31a.

The sheet feeding device 4 includes a feeding cassette 4a provided so as to be insertable into and removable from the apparatus main assembly 2, a feeding roller 4b, provided at an upper portion of the feeding cassette 4a, for feeding the sheet S accommodated in the feeding cassette 4a.

In parallel to a toner image forming operation of the above-described image forming portion 3, the sheet S accommodated in the feeding cassette 4a is fed by the feeding roller 4b and thereafter is separated and conveyed by a conveying roller 4c and a retard roller 4d, and then is conveyed to a registration roller pair 5. Thus, the sheet S is conveyed to the registration roller pair 5, and thereafter is conveyed to a transfer portion 6, formed by the photosensitive drum 31a and a transfer roller 6a, at predetermined timing by the registration roller pair 5.

Thereafter, onto one surface (first surface) of the sheet S conveyed to the transfer portion 6, the toner image formed on the surface of the photosensitive drum 31a is transferred at the transfer portion 6. Thereafter, the sheet is fed to the fixing unit 7 and is heated and pressed in the fixing unit 7, so that the toner image is fixed on the one surface (first surface) of the sheet S.

In this way, after the image is fixed, the sheet S passes through a discharging unit 8 and is discharged onto a discharge tray 11 provided on an upper surface of the apparatus main assembly 2. In the case where images are formed on both surfaces (sides) of the sheet S, the sheet S is not discharged onto the discharge tray 11, but is caused to pass through a path 12 for double side printing (image formation) and then is conveyed again to the registration roller pair 5. Thereafter, the above-described process is repeated, so that the image is formed on a second surface opposite from the image surface.

(Discharging Unit and Driving Unit in Image Forming Apparatus)

Detailed structure of the discharging unit 8 and a driving unit 9 will be described.

As shown in FIG. 1, the discharging unit 8 is a unit, including a path switching member 8c, a discharging roller pair 8a, a reversing roller pair 8d for double side printing, and the like, for feeding the sheet S, fed from the fixing unit 7, to the discharge tray 11 or the path 12 for double side printing. As regards the sheet S fed from the fixing unit 7, the roller pair for feeding the sheet S is selected by the path switching member 8c. In the case where the image formation (printing) on the sheet S is completed, the sheet S is fed to the discharging roller pair 8a by the path switching member 8c, so that the sheet S is discharged onto the discharge tray 11 while a full state detecting flag 8b is raised by the discharging roller pair 8a. In the case of a stage in which the image formation on the first surface when the images are formed on the both surfaces of the sheet S is completed, as regards the sheet, the path of the sheet S is switched by the path switching member 8c, and the sheet S is conveyed to the reversing roller pair 8d for double side printing, not the discharging roller pair 8a. Rotation of the reversing roller pair 8d for double side printing is reversed at predetermined timing, so that the sheet S passes through the path 12 for double side printing and is fed again to the registration roller pair 5. Thereafter, the above-described process is repeated, so that the image is formed on the second surface opposite from the first surface of the sheet S.

The discharging unit 8 is detachably mountable to the apparatus main assembly 2. During assembling of the discharging unit 8, a door member 13 is opened by being rotated in an arrow R1 direction of FIG. 1 and screws are removed, and then the discharging unit 8 is pulled out in an arrow H2 direction of FIG. 1, so that the discharging unit 8 is demounted from the apparatus main assembly 2.

Figure 2:
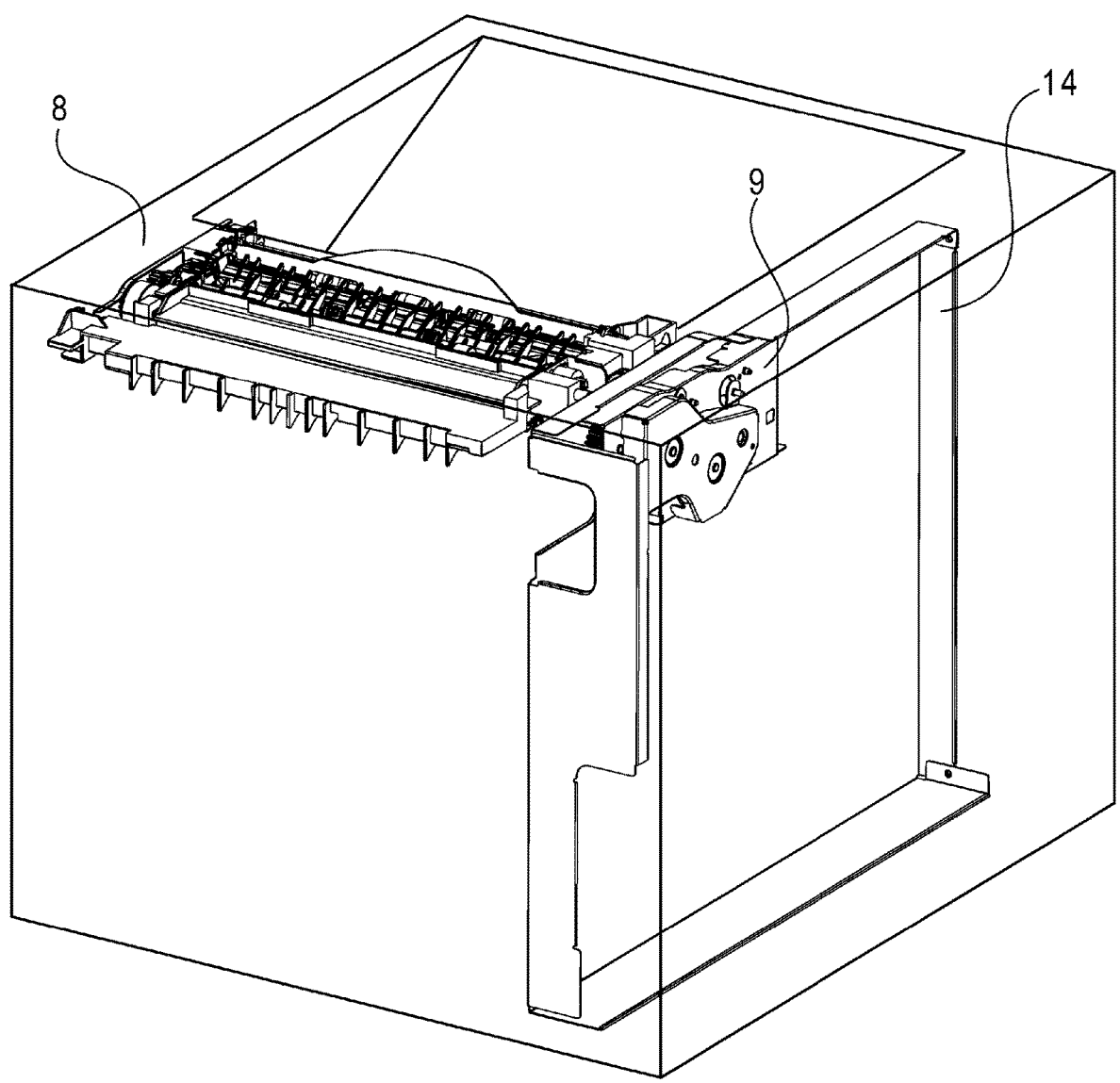
FIG. 2 is a perspective view showing arrangement positions of a discharging unit and a driving unit in the printer.

As shown in FIG. 2, the driving unit 9 is provided on a frame member 14 of the apparatus main assembly 2. The driving unit 9 is disposed adjacent to the discharging unit 8 while sandwiching the frame member 14 therebetween, and transmits drive (driving force) to the fixing unit 7 and the discharging unit 8. In the discharging unit 8, by the drive transmitted from the driving unit 9, the discharging roller pair 8a and the reversing roller pair 8d for double side printing are rotated. Both of the driving unit 9 and the discharging unit 8 are positioned relative to the frame member 14.

(Drive Transmission of Driving Unit and Discharging Unit)

The drive transmission from the driving unit 9 to the discharging unit 8 will be described with reference to FIG. 3.

The drive transmission from the driving unit 9 to the discharging unit 8 is carried out by a coupling portion 10 consisting of a driving (-side) coupling 92 and an intermediary transmission member of the driving unit 9 and a driven(-side) coupling 85 of the discharging unit 8. The driving-side coupling 92 is rotated by transmitting thereto the drive from an intermediary gear 95 receiving the drive from a motor 91 which is a driving source via an unshown driving gear train. The intermediary transmission member 93 engages with the driving-side coupling 92, and therefore, the drive from the driving-side coupling 92 is transmitted thereto and thus the intermediary transmission member 93 is rotated. This intermediary transmission member 93 engages with the driven-side coupling 85 of the discharging unit 8, so that the coupling portion 10 acts as an Oldham's coupling and thus the drive is transmitted from the driving unit 9 to the discharging unit 8. The driven-side coupling 85 transmits the drive to a discharging roller gear 87, and thus rotates the discharging roller pair 8a or the reversing roller pair 8d for double side printing.

Here, a positional deviation between the driving-side coupling 92 and the driven-side coupling 85 increases due to the following concurrent positional deviations. The positional deviations includes a positional deviation of the driving-side coupling 92 in the driving unit 9, a positional deviation between the driving unit 9 and the frame member 14, a positional deviation between the frame member 14 and the discharging unit 8, and a positional deviation of the driven-side coupling 85 in the discharging unit 8. For that reason, the coupling portion 10 is required to absorb the positional deviation between the driving-side coupling 92 and the driven-side coupling 85. In this constitution, the intermediary transmission member 93 is disposed between the driving-side coupling 92 and the driven-side coupling 85. As a result, the coupling portion 10 acts as the Oldham's coupling, and therefore, in the coupling portion 10, the positional deviation between the driving unit 9 and the discharging unit 8 can be absorbed. That is, the coupling portion 10 as a drive transmission device according to this embodiment includes the driving-side coupling 92 of the driving unit 9, the driven-side coupling 85 of the discharging unit 8, and the intermediary transmission member 93. The intermediary transmission member 93 is disposed between the driving-side coupling 92 and the driven-side coupling 85 and transmits a rotational driving force from the driving-side coupling 92 to the driven-side coupling 85.

(Coupling Portion of Driving Unit)

The driving-side coupling 92 and the intermediary transmission member 93 which constitutes the coupling portion 10 on the driving unit 9 side will be specifically described with reference to FIG. 4. Parts (a) and (b) of FIG. 4 are exploded perspective views showing a structure of the coupling portion 10 in Embodiment 1. Part (a) of FIG. 4 is the perspective view of the coupling portion 10 as seen from the driving-side coupling 92 side, and part (b) of FIG. 4 is the perspective view of the coupling portion 10 as seen from the driven-side coupling 85 side.

Figure 3:
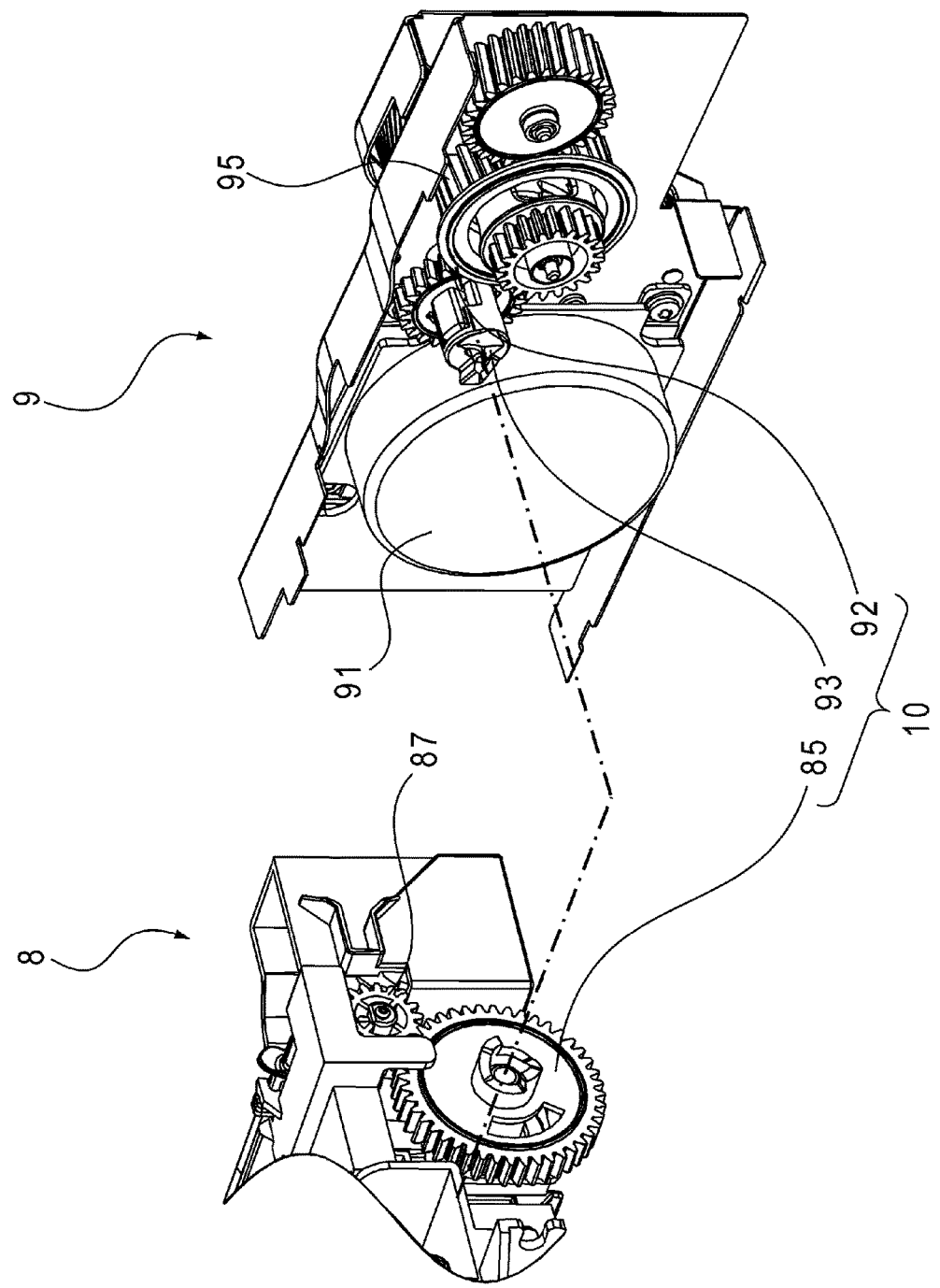
FIG. 3 is a perspective view showing a coupling portion in Embodiment 1.

The driving-side coupling 92 rotates in an arrow Γ1, shown in FIG. 4, about a rotational axis Z1 which is a center line of a shaft member 94, through transmission of the drive from the intermediary gear 95 shown in FIG. 3 to a gear portion 92c.

The intermediary transmission member 93 includes a claw portion 93f as a holding portion held movably in a first direction (X direction), perpendicular to the rotational axis Z1 of the driving-side coupling 92, relative to the driving-side coupling 92 which is one of the two couplings. The intermediary transmission member 93 is locked by the driving-side coupling 92 with respect to the direction of the rotation axis Z1 of the driving-side coupling 92 by engagement of the claw portion 93f shown in FIG. 4 with a hole 92b of the driving-side coupling 92. By this locking, the intermediary transmission member 93 can be retained without being disengaged (disconnected) from the driving unit 9 even during assembling of the apparatus main assembly 2 and during the insertion and removal of the discharging unit 8. Further, the locking portion is movable so as not to prevent relative motion between the driving-side coupling 92 and the intermediary transmission member 93 in the arrow X direction which is perpendicular to the rotational axis Z1 and in which a projected portion 92a of the driving-side coupling 92 extends. Thus, the intermediary transmission member 93 is movably held by the driving-side coupling 92 which is a holding(-side) coupling.

In this embodiment, the constitution in which the intermediary transmission member 93 is held by the driving-side coupling, as the holding-side coupling, which is one of the two couplings constituting the coupling portion 10 was described as an example, but the intermediary transmission member 93 is not limited thereto. For example, a constitution in which the intermediary transmission member 93 is held by the driven-side coupling which is the other one of the above-described two couplings may also be employed. Further, a constitution in which the intermediary transmission member 93 is held by a shaft member with which the holding-side coupling engages may also be employed.

(Coupling Portion of Discharging Unit)

The driven-side coupling 85 constituting the couplings portion 10 in the discharging unit 8 side will be described with reference to FIG. 4.

The driven-side coupling 85 is a non-holding(-side) coupling which is the other coupling of the two couplings constituting the coupling portion 10 and engages with the intermediary transmission member 93 held by the driving-side coupling 92 which is the holding-side coupling, so that the drive is transmitted from the intermediary transmission member 93 to the driven-side coupling 85. The driven-side coupling 85 is rotated in an arrow Γ2 direction shown in FIG. 4, about a rotational axis Z2 which is a center line of a shaft portion 86a of a discharge (unit) frame, through transmission of the drive from the intermediary transmission member 93, so that the drive is transmitted to a discharging roller gear 87 through a gear portion 85f.

(Eccentricity Absorption of Coupling Portion)

Next, motion of the coupling portion 10 when the coupling portion 10 transmits the drive from the driving unit 9 to the discharging unit 8 will be described by paying attention to absorption of eccentricity which is a deviation of a distance between the rotational axis Z1 and the rotational axis Z2.

As shown in part (a) of FIG. 4, the driving-side coupling 92 is provided with the projected portion 92a projecting in the rotational axis Z1 direction convexly and extending in the X direction perpendicular to the rotational axis Z1. The intermediary transmission member 93 is provided with a recess-shaped groove portion 93a which opposes the driving-side coupling 92 with respect to the rotational axis Z1 direction and which is disposed so as to extend along the projected portion 92a with respect to the rotational axis Z1 direction. The projected portion 92a of the driving-side coupling 92 and the groove portion 93a of the intermediary transmission member 93 engage with each other so as to be movable in the X direction (first direction) perpendicular to the rotational axis Z1 of the driving-side coupling 92. As a result, between the intermediary transmission member 93 and the driving-side coupling 92 which rotates in the arrow Γ1 direction in FIG. 4, the projected portion 92a of the driving-side coupling 92 and the groove portion 93a of the intermediary transmission member 93 move in the X direction relative to each other. As a result, between the intermediary transmission member 93 and the driving-side coupling 92 which rotates in the arrow Γ1 direction in FIG. 4, the drive is transmitted so as to absorb the eccentricity with respect to the X direction.

Further, as shown in part (b) of FIG. 4, the driven-side coupling 85 and the intermediary transmission member 93 engage with each other so as to be movable in a second direction which is perpendicular to an axis which is a rotation center of the driven-side coupling 85 and which crosses the first direction. Specifically, the driven-side coupling 85 and the intermediary transmission member 93 engage with each other so as to be movable in a Y direction is perpendicular to the rotational axis Z2 as an axis being the rotation center of the driven-side coupling 85 and which crosses the X direction as the first direction. In this embodiment, as the second direction, the Y direction perpendicular to the X direction is described as an example, but the second direction is not limited thereto. The second direction may preferably be a direction, including a direction perpendicular to the first direction, crossing the first direction in a certain range.

The engagement between the driven-side coupling (non-holding-side coupling) 85 and the intermediary transmission member 93 is constituted only a first quadrant and a third quadrant or only by a second quadrant and a fourth quadrant in a cross-section perpendicular to the rotational axis Z2 of the driven-side coupling 85. Here, the respective quadrants are four regions divided on a plane of coordinates constituted by x axis and y axis when the rotational axis of the driven-side coupling 85 is the origin, the X direction (first direction) is the x axis, and the Y direction (second direction) is the y axis. Specifically, the quadrants will be described with reference to FIGS. 4 and 5.

Engagement and motion between the intermediary transmission member 93 and the driven-side coupling 85 will be described using FIGS. 4 and 5. Parts (a) and (b) of FIG. 5 are schematic views showing the motion of an engaging portion between the intermediary transmission member 93 and the driven-side coupling 85.

As shown in FIG. 4, the intermediary transmission member 93 includes two claw portions 93b and 93c movably engageable with the driven-side coupling 85 which is the other coupling of the two couplings. The two claw portions 93b and 93c are engaging portions engageable with the driven-side coupling 85 so as to be movable in the second direction perpendicular to the rotational axis Z2 of the driven-side coupling 85 and crossing the first direction. The two claw portions 93b and 93c of the intermediary transmission member 93 are provided at positions opposing each other with respect to the rotational axis Z1 as a first axis constituting the rotation center of the intermediary transmission member 93. Further, the two claw portions 93b and 93c of the intermediary transmission member 93 are two intermediary projected portions projecting in a first axial direction of the rotational axis Z1 as the first axis constituting the rotation center of the intermediary transmission member 93. The two claw portions 93b and 93c include flat surface portions 93d and 93e, respectively, as intermediary transmission surfaces for transmitting a rotational driving force to the driven-side coupling 85. The flat surface portions 93d and 93e as the intermediary transmission surfaces are crossing surfaces (or arcuate surfaces) crossing with respect to the first axial direction (rotational axis Z1 direction). The flat surface portions 93d and 93e are contact portions contacting the driven-side coupling 85 with respect to the rotational direction of the driving-side coupling 92 when the driving-side coupling 92 rotates in at least one direction (arrow Γ1 shown in FIG. 4). The two claw portions 93b and 93c of the intermediary transmission member 93 are provided in a side opposite from the above-described groove portion 93a with respect to the rotational axis Z1 direction.

On the other hand, the driven-side coupling 85 engageable with the intermediary transmission member 93 include two claw portions (projected portions) 85b and 85c provided at positions opposing each other via the rotational axis Z2 constituting the rotation center of the driven-side coupling 85 so as to project in an axial direction. The two claw portions 85b and 85c of the driven-side coupling 85 are provided opposed to each other with respect to the rotational axis Z2 direction so as to engage with the two claw portions 93b and 93c, respectively, of the intermediary transmission member 93 with respect to the rotational direction of the driven-side coupling 85 when the driving-side coupling 92 rotates in one direction. The two claw portions 85b and 85c are provided at positions opposing each other with respect to the rotational axis Z2 as a second axis constituting the rotation center of the driven-side coupling 85. Further, the two claw portions 85b and 85c of the driven-side coupling 85 are two driven projected portions projecting in the rotational axis Z2 direction (second axial direction) of the rotational axis Z2 as the second axis constituting the rotation center of the driven-side coupling 85. The two claw portions 85b and 85c include flat surface portions 85d and 85e, respectively, as driven transmission surfaces to which the rotational driving force is transmitted by contact thereof with the flat surface portions 93d and 93e as the intermediary transmission surfaces. The two claw portions 85b and 85c are, similarly as the above-described two claw portions 93b and 93c, contact portions contacting the claw portions 93b and 93c with respect to the rotational direction when the driving-side coupling 92 rotates in at least one direction.

The drive transmission between the intermediary transmission member 93 and the driven-side coupling 85 is carried out while the flat surface portions 93d and 93e of the claw portions 93b and 93c of the intermediary transmission member 93 surface-contact the flat surface portions 85d and 85e of the claw portions 85b and 85c of the driven-side coupling 85, respectively.

As a result, the flat surface portions 85d and 85e of the driven-side coupling 85 and the flat surface portions 93d and 93e of the intermediary transmission member 93 moves relative to each other in the Y direction (second direction) perpendicular to the rotational axis Z2 of the driven-side coupling 85 and perpendicular to the X direction (first direction). That is, these flat surface portions move between a state of part (a) of FIG. 5 and a state of part (b) of FIG. 5. Accordingly, the coupling portion 10 can absorb eccentricity with respect to the Y direction by relative movement of the intermediary transmission member 93 and the driven-side coupling 85 in the Y direction between the intermediary transmission member 93 and the driven-side coupling 85.

Thus, the coupling portion 10 can permit the eccentricity with respect to not only the X direction (first direction) but also the Y direction (second direction).

In the above, the case where there is no deviation angle which is a deviation in axis between the rotational axis Z1 of the driving-side coupling 92 and the rotational axis Z2 of the driven-side coupling 85 has been described. As shown in FIG. 5, in the case where there is eccentricity but there is no deviation angle, motion of the engaging portions between the intermediary transmission member 93 and the driven-side coupling 85 is performed while the intermediary transmission member 93 and the driven-side coupling 85 are in surface-contact with each other. Accordingly, compared with the cases of point contact and line contact, the intermediary transmission member 93 and the driven-side coupling 85 slide with each other in a low-pressure state, and therefore the surface contact is advantageous in terms of suppression of abrasion and of durability.

(Deviation Angle Absorption of Coupling Portion)

Next, the case where the deviation angle which is the deviation in axis between the deviation angle Z1 of the driving-side coupling 92 and the rotational axis Z2 of the driven-side coupling 85 exists will be described. First, a deviation angle α about an axis extending in the X direction will be described, and then a deviation angle β about an axis extending in the Y direction will be described.

First, the deviation angle α about the axis extending in the X direction will be described. Parts (a) and (b) of FIG. 6 are schematic views showing the engaging portion between the intermediary transmission member 93 and the driven-side coupling 85 in the case where the deviation angle α about the axis extending in the X direction exists between the rotational axis Z1 of the driving-side coupling 92 and the rotational axis Z2 of the driven-side coupling 85. Each of parts (a) and 8b) of FIG. 6 includes a front view, a top view and another first view with respect to the X direction. Part (b) of FIG. 6 includes these views in the case where the deviation angle α about the axis extending in the X direction exists in a direction opposite to the direction in the case of part (a) of FIG. 6.

As shown in part (a) of FIG. 6, in the case where the deviation angle α about the axis extending in the X direction generates in one direction between the rotational axis Z1 and the rotational axis Z2, the engaging portion between the intermediary transmission member 93 and the driven-side coupling 85 acts as follows. That is, one claw portion 93b of the intermediary transmission member 93 and one claw portion 85b of the driven-side coupling 85 are rotationally moved about the contact portion between another claw portion 93c and another claw portion 85c so as to be spaced from each other. As a result, engagement between the intermediary transmission member 93 and the driven-side coupling 85 can permit (absorb) the deviation angle α, with respect to the one direction, about the axis extending in the X direction (first direction). Incidentally, a range in which the deviation angle α about the axis extending in the X direction is permitted by the engagement between the intermediary transmission member 93 and the driven-side coupling 85 may preferably be a range from 0° to 15°. The engagement between the intermediary transmission member 93 and the driven-side coupling 85 may also permit a deviation angle larger than 15°. Here, the engagement between the intermediary transmission member 93 and the driven-side coupling 85 refers to a state in which the two claw portions 93b and 93c of the intermediary transmission member 93 contact the two claw portions 85b and 85c, respectively, of the driven-side coupling 85, which oppose the claw portions 93b and 93c with respect to the rotational direction.

On the other hand, as shown in part (b) of FIG. 6, in the case where the deviation angle α about the axis extending in the X direction generates in an opposite direction to the above-described one direction between the rotational axis Z1 and the rotational axis Z2, the engaging portion between the intermediary transmission member 93 and the driven-side coupling 85 acts as follows. That is, one claw portion 93c of the intermediary transmission member 93 and one claw portion 85c of the driven-side coupling 85 are rotationally moved about the contact portion between another claw portion 93b and another claw portion 85b so as to be spaced from each other. As a result, engagement between the intermediary transmission member 93 and the driven-side coupling 85 can permit (absorb) the deviation angle α, with respect to the opposite direction, about the axis extending in the X direction (first direction).

Then, the deviation angle about the axis extending in the Y direction will be described. In the case of a general-purpose Oldham's coupling, of the engaging portions between the intermediary transmission member and each of the two couplings, the deviation angle about the axis extending in the Y direction is absorbed by the engaging portion for absorbing the deviation angle about the axis extending in the X direction and the engaging portion provided in an opposite side with respect to the axial direction. However, in this embodiment, the hole portion 92b of the driving-side coupling 92 and the claw portion 93f of the intermediary transmission member 93 which are shown in FIG. 9 are locked with respect to the Z1 direction. That is, the driving-side coupling 92 and the intermediary transmission member 93 are engaged with each other so as to be movable in the X direction relative to each other, and the intermediary transmission member 93 is movably held by the driving-side coupling 92. For that reason, the deviation angle about the axis extending in the Y direction is not readily absorbed (permitted) by the engaging portion, between the projected portion 92a of the driving-side coupling 92 and the groove portion 93a of the intermediary transmission member 95, provided on a side opposite, with respect to the axial direction, from the engaging portion for absorbing the deviation angle about axis extending in the X direction.

Therefore, in this embodiment, a constitution in which the engaging portion between the intermediary transmission member 93 and the driven-side coupling 85 absorbs not only the deviation angle about the axis extending in the X direction but also the deviation angle about the axis extending in the Y direction is employed. Parts (a) and (b) of FIG. 7 are schematic views showing the engaging portion between the intermediary transmission member 93 and the driven-side coupling 85 in the case where the deviation angle β about the axis extending in the Y direction exists between the rotational axis Z1 of the driving-side coupling 92 and the rotational axis Z2 of the driven-side coupling 85. Each of parts (a) and (b) of FIG. 7 includes a front view, a top view and another front view with respect to the X direction. Part (b) of FIG. 7 includes these views in the case where the deviation angle β about the axis extending in the Y direction exists in a direction opposite to the direction in the case of part (a) of FIG. 7.

As shown in FIG. 7, the engagement between the intermediary transmission member 93 and the driven-side coupling (non-holding-side coupling) 85 is not engagement between the projected portion and the groove portion, but is engagement between the claw portions. This engagement between the claw portions permits rotational movement about a rectilinear line connecting a contact portion between one claw portion 93b and one claw portion 85b with a contact portion between the other claw portion 93c and the other claw portion 85c. For that reason, as shown in parts (a) and (b) of FIG. 7, the engagement between the claw portion 93b of the intermediary transmission member 93 and the claw portion 85b of the driven-side coupling 85 is engagement movable about the axis extending in the Y direction. Further, also the engagement between the claw portion 93c of the intermediary transmission member 93 and the claw portion 85c of the driven-side coupling 85 is engagement movable about the axis extending in the Y direction. Accordingly, in the case where the deviation angle β about the axis extending in the Y direction exists between the rotational axis Z1 and the rotational axis Z2, the engagement between the intermediary transmission member 93 and the driven-side coupling (non-holding-side coupling) 85 acts as follows. That is, both of the engagement between the claw portion 93b and the claw portion 85b and the engagement between the claw portion 93c and the claw portion 85c rotationally move about the axis extending in the Y direction (second direction), and thus can absorb (permit) the above-described deviation angle β. A range in which the deviation angle β about the axis extending in the Y direction is permitted by the engagement between the intermediary transmission member 93 and the driven-side coupling 85 may preferably be a range from 0° to 15°. The deviation angle β may also be permitted in a range larger than 15°.

Therefore, in the coupling portion (Oldham's coupling) as the drive transmission device in this embodiment, the deviation angles α and β about axes extending in the X and Y directions, respectively, can be absorbed between the intermediary transmission member 93 and the driven-side coupling 85. For that reason, the deviation angles in any direction can be permitted.

The two claw portions 93b and 93c of the intermediary transmission member 93 contact the flat surface portions 85d and 85e, of the driven-side coupling (non-holding-side coupling), opposing the flat surface portions 93d and 93e thereof. In the above-described contact state of the two claw portions 93b and 93c, the claw portions 93b and 93b are in non-contact with the opposing driven-side coupling in a side opposite from the flat surface portions 93d and 93e with respect to the rotational direction.

Thus, according to this embodiment, while suppressing rotation non-uniformity, vibration and noise by causing the couplings to easily permit the deviation angle therebetween through engagement of the claw portions of the couplings, in the case where the axes of the two couplings are parallel to each other, abrasion between the two couplings is suppressed by the surface contact therebetween, so that lifetime extension can be realized.

Embodiment 2

(Coupling Portion)

In this embodiment, an image forming apparatus using a coupling portion 20 in place of the coupling portion 10 used in Embodiment 1 is prepared. In the above-described Embodiment 1, the coupling portion 10 where the engagement between the intermediary transmission member and the non-holding-side coupling was the engagement between the claw portions was described as an example. On the other hand, in this embodiment, as an example, the coupling portion 20 where the engagement between the intermediary transmission member and the non-holding-side coupling is engagement between a cylindrical-shaped projected portion and a U-shaped groove portion formed so as to be engageable with the cylindrical-shaped projected portion will be described. Parts (a) and (b) of FIG. 8 are exploded perspective views showing the coupling portion 20 in Embodiment 2. The coupling portion 20 in this embodiment is constituted by the driving-side coupling (holding-side coupling) 92, an intermediary transmission member 193 and a driven-side coupling (non-holding-side coupling) 185.

As regards the coupling portion 20 in this embodiment, constitutions of engagement and holding between the driving-side coupling (holding-side coupling) 92 and the intermediary transmission member 193 are similar to those in the above-described Embodiment 1. In the following, in the coupling portion 20, engagement between the intermediary transmission member 193 and the driven-side coupling 185 which is the non-holding-side coupling will be described with reference to the drawings.

As shown in FIG. 8, the driven-side coupling 185 is provided with a cylindrical-shaped projected portion 185b extending in the Y direction (second direction) and a holding portion 185a for holding the projected portion 185b in the neighborhood of a rotational axis of the driven-side coupling 185. The intermediary transmission member 193 is provided with two U-shaped groove portions 193b formed so that the neighborhood of the rotational axis of the driven-side coupling 185 is removed and so that the cylindrical-shaped projected portion 185b engages with the groove portions 193b. The intermediary transmission member 193 is further provided with a groove portion 193a engageable with the projected portion 92a of the driving-side coupling 92.

(Eccentricity Absorption of Coupling Portion)

Next, motion of the coupling portion 20 when the coupling portion 20 transmits the drive (driving force) will be described by paying attention to absorption of eccentricity which is a deviation of a distance between the rotational axis Z1 and the rotational axis Z2.

First, similarly as in the above-described Embodiment 1, the projected portion 92a of the driving-side coupling 92 and the groove portion 193a of the intermediary transmission member 193 engage with each other so as to be movable in the X direction (first direction) perpendicular to the rotational axis Z1 of the driving-side coupling 92. As a result, between the intermediary transmission member 193 and the driving-side coupling 92 which rotates in the arrow Γ1 direction in FIG. 8, the projected portion 92a of the driving-side coupling 92 and the groove portion 193a of the intermediary transmission member 193 move in the X direction relative to each other similarly as in Embodiment 1. As a result, between the intermediary transmission member 193 and the driving-side coupling 92 which rotates in the arrow Γ1 direction in FIG. 8, the drive is transmitted so as to absorb the eccentricity with respect to the X direction.

Then, motion between the intermediary transmission member 193 and the driven-side coupling 185 will be described. Parts (a) and (b) of FIG. 9 are schematic views showing the motion of an engaging portion between the intermediary transmission member 193 and the driven-side coupling 185 and showing a principle of eccentricity absorption with respect to the Y direction in the coupling portion 20.

The drive transmission between the intermediary transmission member 193 and the driven-side coupling 185 is carried out while curved surface portions 193e of the two groove portions 193b of the intermediary transmission member 193 surface-contact a curved surface portion 185c of the projected portion 185b of the driven-side coupling 185.

As a result, the intermediary transmission member 193 and the driven-side coupling 185 move between a state of part (a) of FIG. 9 and a state of part (b) of FIG. 9 while the curved surface portions 193c and 185c surface-contact each other. That is, the intermediary transmission member 193 and the driven-side coupling 185 move relative to each other in the Y direction perpendicular to the rotational axis Z2 and the X direction. Accordingly, the coupling portion 10 can absorb eccentricity with respect to the Y direction between the intermediary transmission member 193 and the driven-side coupling 185.

Thus, the coupling portion 20 can permit the eccentricity with respect to not only the X direction (first direction) but also the Y direction (second direction).

In the above, using parts (a) and (b) of FIG. 9, the case where there is no deviation angle which is a deviation in axis between the rotational axis Z1 of the driving-side coupling 92 and the rotational axis Z2 of the driven-side coupling 185 has been described. In this case, as described above, motion of the engaging portions between the intermediary transmission member 193 and the driven-side coupling 185 is performed while the curved surface portions 193c of the two groove portions 193b of the intermediary transmission member 193 and the curved surface portion 185c of the projected portion 185b of the driven-side coupling 185 are in surface-contact with each other. Accordingly, also in this embodiment similarly as in Embodiment 1, compared with the cases of point contact and line contact, the intermediary transmission member 193 and the driven-side coupling 185 slide with each other in a low-pressure state, and therefore the surface contact is advantageous in terms of suppression of abrasion and of durability.

(Deviation Angle Absorption of Coupling Portion)

Next, the case where the deviation angle which is the deviation in axis between the deviation angle Z1 of the driving-side coupling 92 and the rotational axis Z2 of the driven-side coupling 185 exists will be described. First, a deviation angle α about an axis extending in the X direction will be described, and then a deviation angle β about an axis extending in the Y direction will be described.

First, the deviation angle α about the axis extending in the X direction will be described. Parts (a) and (b) of FIG. 10 are schematic views showing the engaging portion between the intermediary transmission member 193 and the driven-side coupling 185 in the case where the deviation angle α about the axis extending in the X direction exists between the rotational axis Z1 of the driving-side coupling 92 and the rotational axis Z2 of the driven-side coupling 185. Each of parts (a) and 8b) of FIG. 10 includes a front view, a top view and another first view with respect to the X direction. Part (b) of FIG. 10 includes these views in the case where the deviation angle α about the axis extending in the X direction exists in a direction opposite to the direction in the case of part (a) of FIG. 10.

As shown in part (a) of FIG. 10, in the case where the deviation angle α about the axis extending in the X direction generates in one direction between the rotational axis Z1 and the rotational axis Z2, the engaging portion between the intermediary transmission member 193 and the driven-side coupling 185 acts as follows. That is, one groove portion 193b of the intermediary transmission member 193 and the projected portion 185b of the driven-side coupling 185 on one side are rotationally moved about the contact portion between the other groove portion 193c and the projected portion 185c on the other side so as to be spaced from each other. As a result, engagement between the intermediary transmission member 193 and the driven-side coupling 185 can permit (absorb) the deviation angle α, with respect to the one direction, about the axis extending in the X direction (first direction). Here, the engagement between the intermediary transmission member 193 and the driven-side coupling 185 refers to a state in which the two groove portions 193b of the intermediary transmission member 193 contact the groove portions 185b of the driven-side coupling 185, which oppose the groove portions 193b with respect to the rotational direction.

On the other hand, as shown in part (b) of FIG. 10, in the case where the deviation angle α about the axis extending in the X direction generates in an opposite direction to the above-described one direction between the rotational axis Z1 and the rotational axis Z2, the engaging portion between the intermediary transmission member 193 and the driven-side coupling 185 acts as follows. That is, the other groove portion 193c of the intermediary transmission member 193 and the projected portion 185c of the driven-side coupling 185 on the other side are rotationally moved about the contact portion between the one groove portion 193b and the projected portion 185b on the one side so as to be spaced from each other. As a result, engagement between the intermediary transmission member 193 and the driven-side coupling 185 can permit (absorb) the deviation angle α, with respect to the opposite direction, about the axis extending in the X direction (first direction).

Then, the deviation angle about the axis extending in the Y direction will be described.

Also, in this embodiment, similarly as in Embodiment 1, the engaging portion, between the intermediary transmission member 193 and the driven-side coupling 185, for absorbing the deviation angle about the axis extending in the X direction also absorbs the deviation angle about the axis extending in the Y direction. Parts (a) and (b) of FIG. 11 are schematic views showing the engaging portion between the intermediary transmission member 193 and the driven-side coupling 185 in the case where the deviation angle β about the axis extending in the Y direction exists between the rotational axis Z1 of the driving-side coupling 92 and the rotational axis Z2 of the driven-side coupling 185. Each of parts (a) and (b) of FIG. 11 includes a front view, a top view and another front view with respect to the X direction. Part (b) of FIG. 11 includes these views in the case where the deviation angle β about the axis extending in the Y direction exists in a direction opposite to the direction in the case of part (a) of FIG. 11.

As shown in parts (a) and (b) of FIG. 11, the engagement between the intermediary transmission member 193 and the driven-side coupling (non-holding-side coupling) 185 is engagement between the projected portion and the groove portion. However, the projected portion 185b of the driven-side coupling 185 has the cylindrical shape and constitutes the engaging portion movable about the axis extending in the Y direction. Accordingly, in the case where the deviation angle β about the axis extending in the Y direction exists between the rotational axis Z1 and the rotational axis Z2, the engagement between the intermediary transmission member 193 and the driven-side coupling 185 acts as follows. That is, the engagement between the two groove portions 193b of the intermediary transmission member 193 and the projected portion 185b of the driven-side coupling 185 rotationally move about the axis extending in the Y direction (second direction). As a result, the above-described deviation angle β can be absorbed (permitted).

Therefore, also in the coupling portion (Oldham's coupling) as the drive transmission device in this embodiment, the deviation angles α and β about axes extending in the X and Y directions, respectively, can be absorbed between the intermediary transmission member 193 and the driven-side coupling 185. For that reason, similarly as in Embodiment 1, the deviation angles in any direction can be permitted.

Thus, also in this embodiment, while suppressing rotation non-uniformity, vibration and noise by causing the couplings to easily permit the deviation angle therebetween through engagement of the projected portion and the groove portion, in the case where the axes of the two couplings are parallel to each other, abrasion between the two couplings is suppressed by the surface contact therebetween, so that lifetime extension can be realized.

Embodiment 3

(Image Forming Apparatus)

FIG. 13 is a schematic view showing a general structure of a laser printer 1 as an example of an image forming apparatus in this embodiment.

In FIG. 13, the laser printer 1 includes a laser printer main assembly (hereinafter, referred to as an apparatus main assembly) 2. The apparatus main assembly 2 includes an image forming portion 3 for forming an image by an electrophotographic type, and a sheet feeding device 4 for feeding a sheet S to the image forming portion 3.

The image forming portion 3 includes a cartridge unit 31 including a photosensitive drum 31a as an image bearing member and includes a laser scanner 32 for exposing the photosensitive drum 31a to light. During image formation, the photosensitive drum 31a is exposed to light by the laser scanner 32, so that a latent image is formed on a surface of the photosensitive drum 31a, and thereafter, the latent image is developed and thus a toner image is formed on the surface of the photosensitive drum 31a.

The sheet feeding device 4 includes a feeding cassette 4a provided detachably mountable to the apparatus main assembly 2, a feeding roller 4b, provided at an upper portion of the feeding cassette 4a, for feeding the sheet S accommodated in the feeding cassette 4a.

In parallel to a toner image forming operation of the above-described image forming portion 3, the sheet S accommodated in the feeding cassette 4a is fed by the feeding roller 4b and thereafter is separated and conveyed by a conveying roller 4c and a retard roller 4d, and then is conveyed to a registration roller pair 5. Thus, the sheet S is conveyed to the registration roller pair 5, and thereafter is conveyed to a transfer portion, formed by the photosensitive drum 31a and a transfer roller 6a, at predetermined timing by the registration roller pair 5.

Thereafter, onto one surface of the sheet S conveyed to the transfer portion 6, the toner image formed on the surface of the photosensitive drum 31a is transferred at the transfer portion 6. Thereafter, the sheet is fed to the fixing unit 7 and is heated and pressed in the fixing unit 7, so that the toner image is fixed on the one surface of the sheet S.

After the image is thus fixed, the sheet S is discharged onto a discharge tray 11 provided on an upper surface of the apparatus main assembly 2 while raising a full-state detecting flag 8b by a discharging roller pair 8a of a discharging unit 8 indicated by a chain line in FIG. 13.

(Discharging Unit and Driving Unit in Image Forming Apparatus)

The discharging unit 8 and a driving unit 30 will be described with reference to FIG. 14. FIG. 14 is a perspective view showing positions of the discharging unit 8 and the driving unit 30 in the image forming apparatus.

In FIG. 14, the discharging unit 8 is positioned and fixed to a fixing component part (not shown) mounted to a side plate 21 and a fixing component part (not shown) mounted to a side plate 22, and is disposed between the side plates 21 and 22. The discharging unit 8 is detachably mountable to the apparatus main assembly with respect to a C direction. The sheet S is fed from a fixing unit to the discharging unit 8 in an E1 direction and then is fed from the discharging unit 8 to the discharge tray in an E2 direction. The driving unit 30 is mounted to one side plate 22 from an outside of the side plate 22, and then is fixed with screws.

The driving unit 30 is disposed adjacent to the discharging unit 8 while sandwiching the side plate 22 therebetween, and transmits drive (driving force) to the discharging unit 8. In the discharging unit 8, by the drive transmitted from the driving unit 30, the discharging roller pair 8a is rotated. Both of the driving unit 9 and the discharging unit 8 are positioned relative to the frame member 14.

(Driving Unit and Discharging Unit)

The drive transmission from the driving unit 30 to the discharging unit 8 will be described with reference to FIGS. 15 and 16. Part (a) of FIG. 15 is a perspective view showing the driving unit 30. Part (b) of FIG. 15 is an enlarged view of an output gear 34 (driving-side coupling) and a coupling ratchet 35 (intermediary transmission member). Part (a) of FIG. 16 is a perspective view showing the discharging unit 8. Part (b) of FIG. 16 is an enlarged view of an input gear 41 (driven-side coupling).

The drive transmission from the driving unit 30 shown in FIG. 15 to the discharging unit 8 shown in FIG. 16 is carried out by a coupling portion 50 as a drive transmission device consisting of the output gear 34 (driving-side coupling), the coupling ratchet 35 (intermediary transmission member) and the input gear 41 (driven-side coupling).

The coupling portion 50 is required to absorb the positional deviation between the output gear 34 as the driving-side coupling and the input gear 41 as the driven-side coupling. In this constitution, the coupling ratchet 35 as the intermediary transmission member is disposed between the output gear 34 and the input gear 41. As a result, the coupling portion 50 acts as the Oldham's coupling, and therefore, in the coupling portion 50, the positional deviation between the driving unit 30 and the discharging unit 8 can be absorbed. That is, the coupling portion 50 as a drive transmission device according to this embodiment includes, as shown in FIGS. 12 and 23, the output gear 34 of the driving unit 30, the input gear 41 of the discharging unit 8, and the coupling ratchet 35. The output gear 34 of the driving unit 30 is the driving-side coupling, and the input gear 41 of the discharging unit 8 is the driven-side coupling. The coupling ratchet 35 is disposed between the output gear 34 and the input gear 41 and is the intermediary transmission member for transmitting the rotational driving force from the output gear 34 to the input gear 41.

As shown in part (a) of FIG. 15, to the output gear 34 as the driving-side coupling, the drive is transmitted in an H direction from a motor M, which is a driving source rotationally driven in a K direction, via a gear 29 positioned outside a driving side plate 38 and a gear 33 positioned inside the driving side plate 38. As a result, the output gear 34 as the driven-side coupling is rotated in an L direction. The coupling ratchet 35 as the intermediary transmission member engages with the output gear 34, and therefore, the drive of the output gear 34 is transmitted to the coupling ratchet 35, so that the coupling ratchet 35 is rotated in the same direction. The drive from the gear 33 is branched and is transmitted to gears 36 and 37. The drive of the gear 33 drives a pressing roller (not shown) of the fixing unit via the gear 36 engaging with the gear 33. Further, the drive of the gear 33 drives a pressure-releasing cam (not shown) of the fixing unit via the gear 37 provided coaxially with the gear 33. As shown in part (b) of FIG. 15, the coupling ratchet 35 includes flat surface portions 35a and 35b. A detailed shape of the coupling ratchet 35 will be described later using FIG. 17. This coupling ratchet 35 engages with the input gear 41 of the discharging unit 8, so that the coupling portion 50 acts as the Oldham's coupling and thus the drive is transmitted from the driving unit 30 to the discharging unit 8.

As shown in part (a) of FIG. 16, to the input gear 41 as the driven-side coupling, the drive is transmitted from the coupling ratchet 35, so that the input gear 41 is rotationally driven in a G direction. The drive is transmitted from the input gear 41 in an F direction, so that a discharging roller 43 which is one of the discharging roller pair 8a is rotated via a discharging roller gear 42. The drive of the discharging roller 43 is transmitted to switching gears 44 for double-side printing, so that a switch-back roller 45 is driven. The switch-back roller 45 is capable of switching a rotational direction thereof by a constitution of the switching gears 44 for double-side printing, and is capable of feeding the sheet in both directions indicated as drive directions. As shown in part (b) of FIG. 16, the input gear 41 includes flat surface portions 41a and 41b opposing the flat surface portions 35a and 35b of the coupling ratchet 35 with respect to the rotational direction. The flat surface portions 41a and 41b contact the flat surface portions 35a and 35b of the coupling ratchet 35, so that the drive is transmitted to the input gear 41. A state of the drive transmission from the coupling ratchet 35 to the input gear will be described later using FIGS. 12, 23 and 24. Further, a detailed shape of the input gear 41 will be described later using FIG. 18.

(Shape of Coupling Ratchet)

With reference to FIG. 17, engaging portions of the coupling ratchet 35 with the input gear 41 will be described. Parts (a) and (b) of FIG. 17 are enlarged view of the coupling ratchet 35, wherein part (a) of FIG. 17 is a perspective view of the coupling ratchet 35 and part (b) of FIG. 17 is a side view of the coupling ratchet 35.

As shown in parts (a) and (b) of FIG. 17, the coupling ratchet 35 includes claws 35j. The claws 35j are holding portions to be held by the output gear 41, which is one of the two couplings, so as to be movable in a first direction (X direction shown in FIG. 12) perpendicular to a rotational axis 35e of the output gear 34. The claws 35j have a shape for mounting the coupling ratchet 35 to the output gear 34 shown in FIG. 12. The mounting shape of the claws 35j will be described later using FIGS. 12 and 23.

The coupling ratchet 35 includes engaging portions 35A and 35B movably engageable with the input gear 41 which is the other coupling of the two couplings. The engaging portions 35A and 35B of the coupling ratchet 35 are intermediary projected portions projecting in an axial direction (first axial direction) of the rotational axis 35e as a first axis which is a rotation center of the coupling ratchet 35 and are provided at positions opposing each other with respect to the axis. The engaging portions 35A and 35B of the coupling ratchet 35 include two first surfaces described below and two second surfaces different from the first surfaces.

The engaging portions 35A and 35B of the coupling ratchet 35 include flat surface portions 35a and 35b. These flat surface portions 35a and 35b are intermediary transmission surfaces (first surfaces) for transmitting the rotational driving force in engagement with the input gear 41 which is the other coupling of the two couplings when the output gear 34 rotates in one direction (L direction shown in part (a) of FIG. 15). The flat surface portions 35a and 35b engage with the input gear 41 so as to be movable in a second direction (Y direction shown in FIG. 12) perpendicular to a rotational axis 41e as a first axis which is a rotation center of the input gear 41 and perpendicular to the above-described first direction. In this embodiment, as the second direction, the Y direction perpendicular to the X direction is described as an example, but the second direction is not limited thereto. The second direction may preferably be a direction, including a direction perpendicular to the first direction, crossing the first direction in a certain range.

The two flat surface portions 35a and 35b are disposed in line while sandwiching the rotational axis 35e which is the rotation center of the coupling ratchet 35. The two flat surface portions 35a and 35b are provided at symmetrical positions with respect to the rotational axis 35e. The two flat surface portions 35a and 35b are flat surfaces with an angle P1 of smaller than 90° with respect to a flat surface (plane) perpendicular to the rotational axes of the output gear 34, the coupling ratchet 35 and the output gear 41. In this embodiment, the angle P1 is 85°. The flat surface portions 35a and 35b are provided on the two projected portions projecting in the axial direction of the coupling ratchet 35 on one sheet (on the input gear side in this embodiment). The flat surface portions 35a and 35b of the coupling ratchet 35 transmit the drive to the opposing input gear 41 by engagement with the flat surface portions 41a and 41b of the opposing input gear 41 through surface-contact with the flat surface portions 41a and 41b when the output gear 34 rotates in one direction (L direction shown in part (a) of FIG. 15).

The engaging portions 35A and 35B of the coupling ratchet 35 include flat surface portions (second surfaces) 35c and 35d which slid with and disengage from flat surface portions 41c and 41d of the output gear 41 when the input gear 41 rotates in the above-described first direction during rest of rotation of the output gear 34. The two flat surface portions 35c and 35d are provided at symmetrical positions with respect to the rotational axis 35e. The two flat surface portions 35c and 35d are flat surfaces with an angle P2 larger than 90° with respect to a flat surface perpendicular to the rotational axes of the output gear 34, the coupling ratchet 35 and the input gear 41. That is, the flat surface portions 35c and 35d are inclined surfaces which are inclined with respect to the rotational direction of the coupling ratchet 35. The flat surface portions 35c and 35d are provided on the two engaging portions (intermediary projected portions) 35A and 35B provided so as to project toward one side with respect to the axial direction of the coupling ratchet 35, and are disposed on sides opposite, with respect to the rotational direction of the coupling ratchet 35, from the sides where the flat surface portions 35a and 35b are provided.

The engaging portions (the two projected portions provided with the two flat surface portions 35a and 35b and the two flat surface portions 35c and 35d) 35A and 35B between the coupling ratchet 35 and the input gear 41 constitute ratchet teeth for transmitting the rotational driving force only in one direction.

(Shape of Input Gear)

With reference to FIG. 18, engaging portions 41A and 41B of the input gear 41 with the coupling ratchet 35 will be described. Parts (a) and (b) of FIG. 18 are enlarged view of the input gear 41, wherein part (a) of FIG. 18 is a perspective view of the input gear 41 and part (b) of FIG. 18 is a side view of the input gear 41.

As shown in parts (a) and (b) of FIG. 18, the input gear 41 include the engaging portions 41A and 41B movably engageable with the two engaging portions 35A and 35B of the coupling ratchet 35. The engaging portions 41A and 41B of the input gear 41 are driven projected portions projecting in an axial direction (second axial direction) of a rotational axis 41e as a second axis which is a rotation center of the input gear 41 on one side (coupling ratchet side) and are provided at positions opposing each other with respect to the axis. The engaging portions 41A and 41B of the input gear 41 include two first surfaces described below and two second surfaces different from the first surfaces. The input gear 41 include the flat surface portions (first surfaces) 41a and 41b as driven transmission surfaces to which the rotational driving force is transmitted by the contact with the two engaging portions 35A and 35B of the coupling ratchet 35.

The flat surface portions 41a and 41b engage with the coupling ratchet 35 so as to be movable in a second direction (Y direction shown in FIG. 12) perpendicular to a rotational axis 41e as a second axis which is a rotation center of the input gear 41 and perpendicular to the above-described first direction.

The two flat surface portions 41a and 41b are disposed in line while sandwiching the rotational axis 41e as the second axial direction which is the rotation center of the input gear 41 similarly as in the case of the flat surface portions 35a and 35b of the coupling ratchet 35. The two flat surface portions 41a and 41b are provided at symmetrical positions with respect to the rotational axis 41e. The two flat surface portions 41a and 41b are flat surfaces with an angle P1 of smaller than 90° with respect to a flat surface (plane) perpendicular to the rotational axes of the output gear 34, the coupling ratchet 35 and the output gear 41. In this embodiment, the angle P1 is 85°. The flat surface portions 41a and 41b are provided on the engaging portions 41A and 41B as the above-described driven projected portions projecting in the axial direction of the coupling ratchet 35 on one sheet (on the coupling ratchet side in this embodiment). The flat surface portions 41a and 41b of the input gear 41 transmit the drive to the opposing input gear 41 by engagement with the flat surface portions 35a and 35b of the opposing coupling ratchet 35 through surface-contact with the flat surface portions 35a and 35b when the output gear 34 rotates in one direction (L direction shown in part (a) of FIG. 15).

The engaging portions 41A and 41B of the input gear 41 include flat surface portions (second surfaces) 41c and 41d with an angle P2 larger than 90° similarly as in the case of the coupling ratchet 35. The two flat surface portions 41c and 41d are provided at symmetrical positions with respect to the rotational axis 41e. The two flat surface portions 41c and 41d are flat surfaces with the angle P2 larger than 90° with respect to a flat surface perpendicular to the rotational axes of the output gear 34, the coupling ratchet 35 and the input gear 41. That is, the flat surface portions 41c and 41d are inclined surfaces which are inclined with respect to the rotational direction of the input gear 41, and are contact surfaces contacting the flat surface portions 35a and 35b of the coupling ratchet 35. The flat surface portions 41c and 41d are provided on the projected portions provided on one side with respect to the axial direction of the coupling ratchet 35, and are disposed on sides opposite, with respect to the rotational direction of the input gear 41, from the sides where the flat surface portions 41a and 41b are provided. In the case where the input gear 41 rotates in the above-described first direction during rest of rotation of the output gear 34, when a torque of a certain value or more is exerted on the flat surface portions 41c and 41d, the flat surface portions 41c and 41d slide with the opposing flat surface portions 35c and 35d of the coupling ratchet 35, so that the input gear 41 disengages from the coupling ratchet 35. Here, a torque for disengaging the opposing surfaces (flat surface portions 41c, 41d, 35c, 35d) from each other is set at a small value with an increasing angle P2, of the flat surface portions, which is larger than 90°. When a torque not less than the set torque depending on the angle P2 of the flat surface portions is exerted on the flat surface portions, the above-described flat surface portions slide with each other, so that the engagement therebetween is eliminated (disengaged).

Thus, also the engaging portions 41A and 41B of the input gear 41 with the coupling ratchet 35 constitute ratchet teeth similarly as in the case of the engaging portions of the coupling ratchet 35. The engaging portions 41A and 41B of the input gear 41 with the coupling ratchet 35 are two projected portions provided with the two flat surface portions 41a and 41b and the two flat surface portions 41c and 41d.

(Engaging Portions of Discharging Unit and Driving Unit)

The engagement between the discharging unit 8 and the driving unit 30 will be described using FIG. 19. FIG. 19 is a top (plan) view showing a state of the discharging unit 8 and the driving unit 30 (as seen from above). The discharging unit 8 is detachably mountable to the apparatus main assembly in C directions as described above with reference to FIG. 13. The coupling ratchet 35 of the driving unit 30 and the input gear of the discharging unit 8 engage with each other, and therefore, when the discharging unit 8 is mounted into and demounted from the apparatus main assembly in the C directions, the engaging portions are kept engaged with each other, so that the discharging unit 8 cannot be mounted into and demounted from the apparatus main assembly. For that reason, the input gear 41 is retracted in an M direction, so that the engagement between the input gear 41 and the coupling ratchet 35 is eliminated (released), and thus the mounting and demounting of the discharging unit 8 in the C directions can be carried out without keeping the engagement therebetween.

The retraction of the input gear 41 will be described using FIGS. 20 to 22. FIGS. 20 to 22 are schematic views for illustrating a structure of the input gear 41. Parts (a) of FIG. 20, (a) of FIG. 21 and (a) of FIG. 22 are perspective views each showing the structure of the input gear 41 in the periphery of the input gear 41, and parts (b) of FIG. 20, (b) of FIG. 21 and (b) of FIG. 22 are sectional views each showing the structure of the input gear 41 in the periphery of the input gear 41. Parts (a) and (b) of FIG. 20 show a state in which the input gear 41 and a coupling spring 47 provided between the input gear 41 and a discharge (unit) frame 46 are separated from each other for explaining structures the input gear 41 and the coupling spring 47. Parts (a) and (b) of FIG. 21 show a state of the input gear 41 and the coupling spring 47 when the coupling ratchet 35 of the driving unit 30 engages with the coupling spring 47. The input gear 41 is always urged in an N direction (direction toward the opposing coupling ratchet 35) by the coupling spring 47. Parts (a) and (b) of FIG. 22 show a state in which the coupling ratchet 35 of the driving unit 30 is disengaged from the input gear 41 and is retracted in the M direction (also shown in FIG. 19) of compressing the coupling spring 47 for the purpose of mounting the discharging unit 8 into the image forming apparatus and of demounting the discharging unit 8 from the image forming apparatus. Further, a hooking portion 41f of the input gear 41 engages with a hooking portion 46a of the discharge frame 46, so that the retracted state is maintained.

(Positional Deviation Absorption of Drive Transmission Gear Portion)

FIGS. 12 and 23 show structures of the input gear 41 of the discharging unit 8, the coupling ratchet 35 of the driving unit 30, and the output gear 34. With a boundary indicated by a broken line, component parts to be mounted to the driving unit 30 are shown in side A (driving side), and component parts to be mounted to the discharging unit 8 are shown in side B (driven side). The coupling ratchet 35 is slidable with the output gear 34 in the first direction (X direction) perpendicular to the rotational axis of the output gear 34 via a projected portion 34a and a recessed portion 35g. The coupling ratchet 35 performs a retaining (disengagement-preventing) function through engagement of the claws 35j with holes 34b of the output gear 34. That is, the coupling ratchet 35 is held by the output gear 34 so as to be movable in the X direction. The coupling ratchet 35 and the output gear 34 rotate about a shaft 39 in a T direction.

As described above with reference to FIG. 16, the flat surface portions 41a and 41b of the input gear 41 contact and engage with the flat surface portions 35a and 35b of the coupling ratchet 35, so that the drive (output gear force) is transmitted from the coupling ratchet 35 to the input gear 41. As a result, the coupling ratchet 35 and the input gear 41 rotate about a shaft 46b of the discharge frame 46 in the T direction.

Motion of a slide between the coupling ratchet 35 and the input gear 41 will be described. Parts (a) and (b) of FIG. 24 are schematic sectional views showing motion of engaging portions between the coupling ratchet 35 and the input gear 41. As regards the coupling ratchet 35 and the input gear 41, a rotational axis 35e and a rotational axis 41e are eccentric to each other. When the output gear 34 rotates in one direction, engaging portions 35A and 35B of the coupling ratchet 35 engage with engaging portions 41A and 41B, respectively, of the input gear 41, so that drive transmission therebetween is carried out. Specifically, the drive transmission is carried out while flat surface portions 35a and 35b of the engaging portions 35A and 35B of the coupling ratchet 35 surface-contact flat surface portions 41a and 41b, respectively, of the engaging portions 41A and 41B of the input gear 41. As a result, the coupling ratchet 35 and the input gear 41 move between a state of part (a) of FIG. 24 and a state of part (b) of FIG. 24. At this time, the flat surface portions 35a and 41a and the flat surface portions 35b and 41b slide and move relative to each other in the Y direction perpendicular to the rotation axes 35e and 41e and the X direction. Accordingly, between the coupling ratchet 35 and the input gear 41, eccentricity with respect to the Y direction can be absorbed. In this embodiment, a width U2 of the flat surface portion 35a with respect to the Y direction and a width U1 of the flat surface portion 35b with respect to the Y direction are 6 mm, and a width W2 of the flat surface portion 41a with respect to the Y direction and a width W1 of the flat surface portion 41b with respect to the Y direction are 2 mm, so that slide movement of about 2 mm on one side (about 4 mm range) can be made.

As described above, as regards the output gear 34 and the input gear 41, a constitution having a degree of freedom with respect to the two directions (X, Y) is employed, so that a deviation due to eccentricity of the center axes is absorbed and thus the rotational drive is smoothly transmitted.

(Slide Amount)

FIG. 25 is a schematic view of the output gear 34 and the coupling ratchet 35 as seen from a Q direction shown in FIG. 23. The coupling ratchet 35 is slidably movable in the first direction (X direction) perpendicular to the shaft 39 in movable amounts T1 and T2 each from an end of an elongated round hole 35h to the shaft 39. In this embodiment, from a relationship between a tolerance and the number of component parts interposed between the coupling ratchet 35 and the input gear 41, each of the slide amounts T1 and T2 was set at about 2.0 mm on one side (about 4.0 mm range).

However, each of the slide amounts T1 and T2 is not limited to about 2.0 mm on one side, but may also be set correspondingly to the constitution.

(Engaging Portion)

Part (a) of FIG. 26 shows a state in which during normal printing (when the output coupling 34 rotates in one direction (AA direction), the coupling ratchet 35 on the output side (driving side) and the input gear 41 on the input side (driven side) engage with each other and thus the drive is transmitted. As described above with reference to FIGS. 12, 16 and 23, the flat surface portions 41a and 41b of the input gear 41 contact the flat surface portions 35a and 35b of the coupling ratchet 35, so that both of the coupling ratchet 35 and the input gear 41 rotate in the AA direction as shown in part (a) of FIG. 26. In this embodiment, the angle P1 of the flat surface portions 35a, 35b, 41a and 41b is smaller than 90°, and therefore, the engagement between the coupling ratchet 35 and the input gear 41 is not released (eliminated) during drive rotation of the output gear 34.

Part (b) of FIG. 26 shows an engagement state between the coupling ratchet 35 on the output side (driving side) and the input gear 41 on the input side (driven side) in the case where a user pulls out the sheet S, jammed in the neighborhood of the discharging roller 43, in a DD direction as shown in FIG. 27. In this case, the discharging roller 43 is rotated in the DD direction by the sheet S pulled out, so that the input gear 41 is on the output side opposite from the state of part (a) of FIG. 26. For this reason, relative to the coupling ratchet 35 (output gear 34) of which rotation is stopped, the input gear 41 is rotated in a BB direction, so that the flat surface portion 41c(41d) of the input gear 41 contacts the flat surface portion 35c(35d) of the coupling ratchet 35 opposing the input gear 41. The angle P2 of the flat surface portions 41c and 41d and the flat surface portions 35c and 35d are larger than 90°. For that reason, when the two flat surface portions 41c and 41d and the two flat surface portions 35c and 35d opposing the two flat surface portions 41c and 41d contact each other and a torque of a certain value or more is exerted on these flat surface portions, the two flat surface portions 41c and 41d and the two flat surface portions 35c and 35d slide with each other, so that the input gear 41 is retracted in the CC direction (direction of being spaced from the coupling ratchet 35 in the axial direction) against an urging force of the spring 47. That is, by contact of the flat surface portions 35c and 35d which are inclined surfaces with the flat surface portions 41c and 41d which are contact surfaces contacting the inclined surfaces, a relative position between the coupling ratchet 35 and the input gear is spaced more than when the rotational driving force is transmitted. When the input gear 41 is retracted in such a manner, the engagement between the coupling ratchet 35 and the input gear 41 is released (disengaged).

For that reason, a load on a side upstream of the engaging portion between the coupling ratchet 35 and the input gear 41 is not exerted on the sheet S, and therefore, the sheet S can be pulled out without causing a phenomenon such that a large load is exerted on the sheet S and thus the sheet S is torn and an excessive operating force is exerted on the sheet S.

As described above, the coupling portion in this embodiment is capable of absorbing the deviation with respect to the X direction and the Y direction perpendicular to the X direction between the driving-side output gear 34 and the driven-side input gear 41 via the coupling ratchet 35 which is the intermediary transmission member. In addition, a clutch function of transmitting the drive in one direction can be realized in a compact manner without increasing the number of component parts.

In this embodiment, the constitution in which the coupling ratchet 35 which is the intermediary transmission member was movably held by the output gear 34 which is the driving-side coupling was described as an example, but the present invention is not limited thereto. A constitution in which the coupling ratchet 35 which is the intermediary transmission member is movably held by the input gear 41 which is the driven-side coupling may also be employed.

Further, a constitution in which the coupling ratchet 35 is held by another component part (not shown) different from the driving-side coupling and the driven-side coupling so as to be slidable with the driving-side coupling and the driven-side coupling.

Embodiment 4

A coupling portion as a drive transmission device according to Embodiment 4 will be described. A general structure of an image forming apparatus in this embodiment is similar to that in the above-described Embodiment 3 and therefore will be omitted from description in this embodiment. Further, also a structure of the coupling portion in this embodiment is substantially similar to those in the above-described embodiments, and therefore, members (portions) having similar functions are represented by the same reference numerals or symbols and will be omitted from description. In the following, an engaging portion, which is a facsimile of this embodiments, of an intermediary transmission member and one of two couplings for transmitting drive only in one direction will be described using FIGS. 28 and 29.

FIG. 28 is a side view showing an output gear 34, a coupling ratchet 35 and an output gear 41 which constitute the coupling portion according to this embodiment. Part (a) of FIG. 29 is a perspective view of the input gear 41, and part (b) of FIG. 29 is a perspective view of the coupling ratchet 35. As shown in (a) of FIG. 29, two flat surface portions 41a and 41b which are driven transmission surfaces (first surfaces) provided at respective engaging portions 41A and 41B of the input gear 41 are different in angle P1 from those in the above-described Embodiment 3. Specifically, the flat surface portions 41a and 41b from flat surfaces each having the angle P1 of 90° or more with respect to a flat surface perpendicular to rotation axes of the output gear 34, the coupling ratchet 35 and the input gear 41. Further, as shown in (b) of FIG. 29, flat surface portions 35a and 35b, opposing the flat surface portions 41a and 41b, which are intermediary transmission surfaces (first surfaces) provided at respective engaging portions 35A and 35B of the coupling ratchet 35 form inclined surfaces with the angle P1. Specifically, the flat surface portions 35a and 35b of the coupling ratchet 35 from the inclined surfaces each having the angle P1 of 90° or more with respect to a flat surface perpendicular to the rotation axes of the output gear 34, the coupling ratchet 35 and the input gear 41. When the coupling ratchet 35 rotates in the BB direction, the flat surface portions 35a and 35b of the coupling ratchet 35 contacts (engage with) the flat surface portions 41a and 41b of the input gear 41 opposing the coupling ratchet 35 with respect to the rotational direction, and transmits the drive to the input gear 41, so that the coupling ratchet 35 rotates the input gear 41.

Here, when a torque (for example, torques of the discharging roller 43 and the switch-back roller 45 of the discharging unit 8) on a side downstream of the input gear 41 of the discharging unit 8 is a certain value or more, the above-described opposing surfaces slide with each other. The opposing surfaces are the flat surface portions 41a and 35a and the flat surface portions 41b and 35b. When the opposing surfaces of the coupling ratchet 35 and the input gear 41 slide with each other, the input gear 41 is moved in the CC direction (direction of being spaced from the coupling ratchet 35 in the axial direction) against the urging force of the spring 47, so that the engagement of the input gear 41 with the coupling ratchet 35 is released. Here, the torque for releasing the engagement between the opposing surfaces (the flat surface portions 41a and 35a, and the flat surface portions 41*b* and 35*b*) is a smaller set torque with a larger angle which is 90° or more, and when a torque not less than the set torque depending on this angle, the opposing surfaces slide with each other and thus the engagement is released.

Thus, the engaging portion between the input gear 41 and the coupling ratchet 35 can be not only used for being slid and moved in the second direction (Y direction) in which the eccentricity is permitted but also caused to function as a torque limiter. As a result, in the case where an unnatural load is exerted on the engaging portion, the drive of the input gear 41 by the coupling ratchet 35 is disconnected, so that breakage of the gears or the like can be prevented. Here, the unnatural load refers to a load causing lock of the discharging roller 43 and the switch-back roller 45 of the discharging unit 8 due to some factor, and refers to the case where an excessive torque is exerted on the engaging portion.

Further, in the case where the sheet S jams in the discharging roller 43 and jam clearance is carried out, similarly as in Embodiment 3, the flat surface portions 41*c* and 41*d* of the input gear 41 and the flat surface portions 35*c* and 35*dd* of the coupling ratchet 35 slide with each other. As a result, the input gear 41 idles in the BB direction relative to the coupling ratchet 35 and is retracted in the CC direction. Here, the flat surface portions 41*c* and 41*d* are second surfaces provided at the engaging portions 41A and 41B of the input gear 41, and are contact surfaces contacting the flat surface portions 35*c* and 35*d* as inclined surfaces. The flat surface portions 35*c* and 35*d* are second surfaces provided at the engaging portions 35A and 35B of the coupling ratchet 35, and are inclined surfaces which are inclined with respect to the rotational direction of the coupling ratchet 35.

Thus, also in this embodiment, the coupling portion is capable of absorbing the deviation with respect to the X direction and the Y direction perpendicular to the X direction between the driving-side output gear 34 and the input-side input gear 41 via the coupling ratchet 35 which is the intermediary transmission member. In addition, a clutch function of transmitting the drive in one direction can be realized in a compact manner without increasing the number of component parts.

Other Embodiments

In the above-described embodiments, as the unit detachably mountable to the apparatus main assembly of the image forming apparatus, the discharging unit was described as an example, but the present invention is not limited thereto. For example, when a unit, such as a cartridge unit or a fixing unit, which is detachably mountable to the apparatus main assembly and which includes a member rotated by transmission of drive from the apparatus main assembly side is prepared, such a unit may also be employed. In an image forming apparatus including such a detachably mountable unit, a similar effect can be obtained even when the present invention is applied to a drive transmission device for transmitting the drive from the apparatus main assembly to the unit.

Further, in the above-described embodiments, the constitution in which the intermediary transmission member is movably held by the driving-side coupling was described as an example, but the present invention is not limited thereto. A constitution in which the intermediary transmission member is movably held by the driven-side coupling may also be employed. In these cases, the former is the constitution of the coupling portion in which the intermediary transmission member and the driven-side coupling engage with each other, whereas the latter is the constitution of the coupling portion in which the driving-side coupling and the intermediary transmission member engage with each other. That is, the constitution in which the driving-side coupling includes driving projected portions and the intermediary transmission member includes intermediary projected portions engageable with the driving projected portions in order to transmit the rotational driving force of the driving-side coupling is employed.

In this case, for example, the driving-side coupling is provided, as the driving projected portions, with the claw portions 93*b* and 93*c* which were described in Embodiment 1 and which were provided on the intermediary transmission member 93. Then, the intermediary transmission member is provided, as the intermediary projected portions, with the claw portions 85*b* and 85*c* which were described in Embodiment 1 and which were provided on the driven-side coupling 85. The driving projected portions of the driving-side coupling are provided, similarly as the claw portions 93*b* and 93*c* of the intermediary transmission member 93 described in Embodiment 1, so as to project in the first axial direction of the first axis which is the rotation center of the driving-side coupling, and include the drive transmission surfaces for transmitting the rotational driving force to the intermediary transmission member. Further, the intermediary projected portions of the intermediary transmission member are provided, similarly as the claw portions 85*b* and 85*c* of the driven-side coupling described in Embodiment 1, so as to project in the second axial direction of the second axis which is the rotation center of the intermediary transmission member. The intermediary projected portions of the intermediary transmission member include the intermediary transmission surfaces to which the rotational driving force is transmitted by contact with the driving transmission surfaces. Further, the driving transmission surfaces include crossing surfaces or arcuate surfaces which cross the first axial direction of the first axis which is the rotation center of the intermediary transmission member. Also by employing such a constitution, effects similar to those of the above-described embodiments are obtained.

Alternatively, the driving-side coupling is provided, as the driving projected portions, with the engaging portions 35A and 35B which were described in Embodiments 3 and 4 and which were provided on the coupling ratchet 35. Then, the intermediary transmission member is provided, as the intermediary projected portions, with the engaging portions 41A and 41B which were described in Embodiments 3 and 4 and which were provided on the input gear 41. The driving projected portions of the driving-side coupling are provided, similarly as the engaging portions 35A and 35B of the coupling ratchet 35 described in Embodiments 3 and 4, so as to project in the first axial direction of the first axis which is the rotation center of the driving-side coupling. Further, the driving projected portions and include the drive transmission surfaces for transmitting the rotational driving force to the intermediary transmission member and include inclined surfaces which are inclined with respect to the rotational direction of the driving-side coupling. Further, the intermediary projected portions of the intermediary transmission member are provided, similarly as the engaging portions 41A and 41B of the input gear 41 described in Embodiments 3 and 4, so as to project in the second axial direction of the second axis which is the rotation center of the intermediary transmission member. Further, the intermediary projected portions of the intermediary transmission member include the intermediary transmission surfaces to which the rotational driving force is transmitted by contact with the driving transmission surfaces, and include contact surfaces contacting the inclined surfaces. Also by employing such a constitution, effects similar to those of the above-described embodiments are obtained.

In the above-described embodiments, as the image forming apparatus including the unit detachably mountable thereto, the printer was described, but the present invention is not limited thereto. For example, other image forming apparatuses, such as a copying machine, a facsimile machine and a multi-function machine having functions of these machines in combination, may also be employed. By applying the present invention to drive transmission devices of these image forming apparatuses, similar effects can be achieved.

In the above-described embodiments, as a recording type, the electrophotographic type was described, but the recording type is not limited thereto. For example, another recording type such as an ink jet type may also be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2017-010063 filed on Jan. 24, 2017, 2017-010064 filed on Jan. 24, 2017 and 2017-218073 filed on Nov. 13, 2017, which are hereby incorporated by reference herein in their entirety.

What is claimed is:

1. A drive transmission device comprising:
   a driving-side coupling;
   a driven-side coupling; and
   an intermediary transmission member provided between said driving-side coupling and said driven-side coupling and configured to transmit a rotational driving force from said driving-side coupling to said driven-side coupling, said intermediary transmission member including:
   (i) two projected portions projecting in an axial direction of said intermediary transmission member, the projecting portions opposing each other with respect to an axis which is a rotation center of said intermediary transmission member and each of the two projected portions including a contact portion; and
   (ii) a plurality of holding portions,
   wherein said driving-side coupling and said intermediary transmission member engage with each other so as to be movable relative to each other in a first direction perpendicular to an axis which is a rotation center of said driving-side coupling,
   wherein said driven-side coupling and said intermediary transmission member engage with each other so as to be movable relative to each other in a second direction crossing the first direction and perpendicular to an axis which is a rotation center of said driven-side coupling,
   wherein one of said driving-side coupling and said driven-side coupling is a holding-side coupling that holds said intermediary transmission member, the other one of said driving-side coupling and said driven-side coupling is a non-holding-side coupling, the holding-side coupling includes a plurality of holes, and each holding portion of the plurality of holding portions engages with a hole of the plurality of holes so as to prevent said intermediary transmission member from disengaging from the holding-side coupling,
   wherein, when said driving-side coupling rotates in one direction, each contact portion of the two projected portions contacts a portion of said non-holding-side coupling that opposes the contact portion with respect to a rotational direction, and
   wherein, when said intermediary transmission member engages with said non-holding-side coupling in a manner that forms a deviation angle between said rotation center of said driving-side coupling and said rotation center of said driven-side coupling, each of the two projected portions moves away from said non-holding-side coupling after engaging with said non-holding-side coupling.

2. A drive transmission device according to claim 1, wherein, in a cross-section perpendicular to an axis which is the rotation center of said non-holding-side with the axis which is the rotation center of said non-holding-side coupling being an origin, the first direction being an x axis, and the second direction being a y axis, the engagement of the two projected portions of said intermediary transmission member with said non-holding-side coupling is made only in one of (i) first and third quadrants and (ii) second and fourth quadrants.

3. A drive transmission device according to claim 1, wherein in a state in which each of said contact portions contacts said non-holding-side coupling opposing said contact portion with respect to the rotational direction, each of said two projected portions of said intermediary transmission member is in non-contact with said non-holding-side coupling on a side opposite from said contact portion with respect to the rotational direction.

4. A drive transmission device according to claim 1, wherein in a state in which each of said contact portions of said two projected portions contacts said non-holding-side coupling opposing said contact portion with respect to the rotational direction, one of said two projected portions moves rotationally about said contact portion of the other projected portion with said non-holding-side coupling and permits the deviation angle with respect to an axis extending in the first direction, and said two projected portions move rotationally about a rectilinear line connecting said contact portions of said two projected portions with said non-holding-side coupling and permits the deviation angle with respect to an axis extending in the second direction.

5. A drive transmission device according to claim 1, wherein the engagement of said intermediary transmission member with said non-holding-side coupling is surface contact when rotation shafts of said two couplings are parallel to each other.

6. An image forming apparatus for forming an image on a sheet, comprising:
   a main assembly;
   a unit detachably mountable to said main assembly; and
   a drive transmission device according to claim 1,
   wherein said drive transmission device is configured to transmit a driving force from said main assembly to said unit.

7. A drive transmission device according to claim 1, wherein said holding-side coupling holds said intermediary transmission member when said non-holding-side coupling is not engaged with said intermediary transmission member.

8. A drive transmission device comprising:
   a driving-side coupling;
   a driven-side coupling; and
   an intermediary transmission member provided between said driving-side coupling and said driven-side coupling and configured to transmit a rotational driving force from said driving-side coupling to said driven-side coupling, wherein said driving-side coupling and said intermediary transmission member engage with each other so as to be movable relative to each other in a first direction perpendicular to a rotation shaft of said driving-side coupling, wherein said driven-side coupling and said intermediary transmission member engage with each other so as to be movable relative to each other in a second direction crossing the first direction and perpendicular to a rotation shaft of said driven-side coupling, and wherein said intermediary transmission member includes (i) two engaging portions engaging with one of said driving-side coupling and said driven-side coupling and (ii) holding portions engaging with holes provided in the other one of said driving-side coupling and said driven-side coupling, the two engaging portions being arranged on a straight line across a rotational center of the intermediate transmission member and transmitting a rotational driving force only in one direction, each holding portion extending in the first direction to prevent said intermediary transmission member from disengaging from the other one of said driving-side coupling and said driven-side coupling.

9. A drive transmission device according to claim 8, wherein each of the two engaging portions is a ratchet tooth which transmits a driving force in engagement by contact between opposing surfaces when said driving-side coupling rotates in one direction and which eliminates the engagement through sliding between the opposing surfaces under application of a torque of a certain value or more when the driven-side coupling rotates in the one direction during stop of rotation of said driving-side coupling.

10. A drive transmission device according to claim 9, wherein each of the two engaging portions transmits the driving force in engagement by contact between the opposing surfaces when said driving-side coupling rotates in one direction and eliminates the engagement through sliding between the opposing surfaces when the torque of the certain value or more is exerted on said engaging portion.

11. A drive transmission device according to claim 8, wherein each of the two engaging portions has (i) a first surface where the rotational driving force is transmitted by engagement of the engaging portion with either one of said driving-side coupling and said driven-side coupling when said driving-side coupling rotates in one direction and (ii) a second surface, different from the first surface, where the engagement is eliminated by sliding with said one coupling when said driven-side coupling rotates in the one direction during stop of rotation of said driving-side coupling.

12. A drive transmission device according to claim 11, wherein the second surface is a surface with an angle of more than 90° with respect to a flat surface perpendicular to rotation shafts of said driving-side coupling and said driven-side coupling, and when a torque of a certain value or more is exerted on a surface of said one coupling opposing the second surface, the engagement is eliminated through sliding between the surfaces.

13. A drive transmission device according to claim 11, wherein the first surface is a surface with an angle of less than 90° with respect to a flat surface perpendicular to rotation shafts of said driving-side coupling and said driven-side coupling and transmits the driving force in engagement by surface contact with a surface of said one coupling opposing the first surface with respect to a rotational direction.

14. A drive transmission device according to claim 11, wherein the first surface is a surface with an angle of less than 90° with respect to a flat surface perpendicular to rotation shafts of said driving-side coupling and said driven-side coupling and transmits the driving force in engagement by surface contact with a surface of said one coupling opposing the first surface with respect to a rotational direction, and when a torque of a certain value or more is exerted on the first surface, the engagement is eliminated through sliding between the surfaces.

15. An image forming apparatus for forming an image on a sheet, comprising:
a unit including a driven-side coupling and detachably mountable to said image forming apparatus;
a driving-side coupling; and
an intermediary transmission member provided between said driving-side coupling and said driven-side coupling and configured to transmit a rotational driving force from said driving-side coupling to said driven-side coupling, said intermediary transmission member including;
(i) two projected portions projecting in an axial direction of said intermediary transmission member, the projecting portions opposing each other with respect to an axis which is a rotation center of said intermediary transmission member and each of the two projected portions including a contact portion; and
(ii) a plurality of holding portions,
wherein said driving-side coupling and said intermediary transmission member engage with each other so as to be movable relative to each other in a first direction perpendicular to an axis which is a rotation center of said driving-side coupling,
wherein said driven-side coupling and said intermediary transmission member engage with each other so as to be movable relative to each other in a second direction crossing the first direction and perpendicular to an axis which is a rotation center of said driven-side coupling,
wherein one of said driving-side coupling and said driven-side coupling is a holding-side coupling that holds said intermediary transmission member, the other one of said driving-side coupling and said driven-side coupling is a non-holding side coupling, the holding-side coupling includes a plurality of holes, each holding portion of the plurality of holding portions engages with a hole of the plurality of holes so as to prevent said intermediary transmission member from disengaging from the holding-side coupling,
wherein, when said driving-side coupling rotates in one direction, each contact portion of the two projected portions contacts a portion of said non-holding-side coupling that opposes the contact portion with respect to a rotational direction, and
wherein, when said intermediary transmission member engages with said non-holding-side coupling in a manner that forms a deviation angle between said rotation center of said driving-side coupling and said rotation center of said driven-side coupling, each of the two projected portions moves away from said non-holding-side coupling after engaging with said non-holding-side coupling.

16. An image forming apparatus according to claim 15, wherein said holding-side coupling holds said intermediary transmission member when said non-holding-side coupling is not engaged with said intermediary transmission member.

17. An image forming apparatus for forming an image on a sheet, comprising:
- a unit including a driven-side coupling and detachably mountable to said image forming apparatus;
- a driving-side coupling; and
- an intermediary transmission member provided between said driving-side coupling and said driven-side coupling and configured to transmit a rotational driving force from said driving-side coupling to said driven-side coupling,
- wherein said driving-side coupling and said intermediary transmission member engage with each other so as to be movable relative to each other in a first direction perpendicular to a rotation shaft of said driving-side coupling,
- wherein said driven-side coupling and said intermediary transmission member engage with each other so as to be movable relative to each other in a second direction crossing the first direction and perpendicular to a rotation shaft of said driven-side coupling, and
- wherein said intermediary transmission member includes (i) two engaging portions engaging with one of said driving-side coupling and said driven-side coupling and (ii) holding portions engaging with holes provided in the other one of said driving-side coupling and said driven-side coupling, the two engaging portions being arranged on a straight line across a rotational center of the intermediate transmission member and transmitting a rotational driving force only in one direction, each holding portion extending in the first direction to prevent said intermediary transmission member from disengaging from the other one of said driving-side coupling and said driven-side coupling.

* * * * *